(12) United States Patent
Jang et al.

(10) Patent No.: US 12,068,852 B2
(45) Date of Patent: Aug. 20, 2024

(54) APPARATUS AND METHOD FOR DETECTING FALSE ALARM OF DECRYPTION IN WIRELESS COMMUNICATION SYSTEM

(71) Applicants: Samsung Electronics Co., Ltd., Gyeonggi-do (KR); Research & Business Foundation Sungkyunkwan University, Gyeonggi-do (KR)

(72) Inventors: Min Jang, Gyeonggi-do (KR); Sanghyo Kim, Gyeonggi-do (KR); Hyunjae Lee, Gyeonggi-do (KR); Hyosang Ju, Gyeonggi-do (KR); Jonghwan Kim, Gyeonggi-do (KR); Hyuntack Lim, Gyeonggi-do (KR); Hongsil Jeong, Gyeonggi-do (KR)

(73) Assignees: Samsung Electronics Co., Ltd (KR); Research and Business Foundation Sungkyunkwan University (KR)

( * ) Notice: Subject to any disclaimer, the term of this patent is extended or adjusted under 35 U.S.C. 154(b) by 303 days.

(21) Appl. No.: 17/433,152

(22) PCT Filed: Feb. 21, 2020

(86) PCT No.: PCT/KR2020/002543
§ 371 (c)(1),
(2) Date: Aug. 23, 2021

(87) PCT Pub. No.: WO2020/171651
PCT Pub. Date: Aug. 27, 2020

(65) Prior Publication Data
US 2022/0140944 A1 May 5, 2022

(30) Foreign Application Priority Data

Feb. 21, 2019 (KR) .................. 10-2019-0020328

(51) Int. Cl.
*H04L 1/00* (2006.01)
*H04L 1/20* (2006.01)

(52) U.S. Cl.
CPC .......... *H04L 1/0061* (2013.01); *H04L 1/0026* (2013.01); *H04L 1/0046* (2013.01); *H04L 1/203* (2013.01)

(58) Field of Classification Search
CPC ... H04L 1/0061; H04L 1/0026; H04L 1/0046; H04L 1/203
(Continued)

(56) References Cited

U.S. PATENT DOCUMENTS 10,361,718 B2    7/2019  Jang et al.
2017/0339586 A1*  11/2017  Chen .................. H04B 17/309
(Continued)

FOREIGN PATENT DOCUMENTS

CN   111448771 B   *  9/2023  ............ H03M 13/09
EP   3 396 862         10/2018
KR   1020170136239     12/2017

OTHER PUBLICATIONS

PCT/ISA/210 Search Report issued on PCT/KR2020/002543, Jun. 19, 2020, pp. 5.
(Continued)

*Primary Examiner* — Faisal Choudhury
(74) *Attorney, Agent, or Firm* — The Farrell Law Firm, P.C.

(57) ABSTRACT

The present disclosure relates to a 5th (5G) generation or pre-5G communication system for supporting a higher data transmission rate beyond a 4th (4G) generation communication system such as long term evolution (LTE). The present disclosure relates to false alarm detection of detecting in a wireless communication system, and an operating method of a receiving node may include receiving a signal (Continued)

from a transmitting node, obtaining a plurality of decoding paths by decoding bits contained in the received signal, and determining whether the decoding is successful based on a detection metric determined based on values representing path metrics of the plurality of the decoding paths.

20 Claims, 21 Drawing Sheets

(58) Field of Classification Search
USPC .......................................................... 370/329
See application file for complete search history.

(56) References Cited

U.S. PATENT DOCUMENTS

| | | |
|---|---|---|
| 2018/0034589 A1 | 2/2018 | Sun et al. |
| 2018/0083655 A1 | 3/2018 | El-Khamy et al. |
| 2018/0241504 A1 | 8/2018 | Raza et al. |
| 2018/0323810 A1* | 11/2018 | Sarkis ................... H03M 13/13 |
| 2020/0028616 A1* | 1/2020 | Kang ..................... H04L 1/0051 |
| 2022/0140944 A1* | 5/2022 | Jang ...................... H04L 1/0061 |
| | | 370/329 |

OTHER PUBLICATIONS

PCT/ISA/237 Written Opinion issued on PCT/KR2020/002543, Jun. 19, 2020, pp. 6.

Alexious Balatsoukas-Stimming, Mani Bastani Parizi, and Andreas Burg, EPFL, Lausanne, Switzerland, On Metric Sorting for Successive Cancellation List Decoding of Polar Codes, Jan. 26, 2015, pp. 4.

Korean Office Action dated May 13, 2024 issued in counterpart application No. 10-2019-0020328, 12 pages.

* cited by examiner

APPARATUS AND METHOD FOR DETECTING FALSE ALARM OF DECRYPTION IN WIRELESS COMMUNICATION SYSTEM

PRIORITY

This application is a National Phase Entry of International Application No. PCT/KR2020/002543, which was filed on Feb. 21, 2020, and claims priority to Korean Patent Application No. 10-2019-0020328, filed in the Korean Intellectual Property Office on Feb. 21, 2019, the entire content of each of which is incorporated herein by reference.

TECHNICAL FIELD

The present disclosure generally relates to a wireless communication system, and more particularly, to an apparatus and a method for detecting a false alarm of decoding in the wireless communication system.

BACKGROUND ART

To satisfy a wireless data traffic demand which is growing after a $4^{th}$ generation (4G) communication system is commercialized, efforts are exerted to develop an advanced $5^{th}$ generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation. Besides, the 5G system is working on hybrid frequency shift keying and quadrature amplitude modulation (FQAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

Meanwhile, in this 5G communication system, there is a false alarm that decoding success is erroneously determined due to a noise in a channel even though a signal is not transmitted. Thus, techniques for effectively reducing occurrence of the false alarm by using a path metric of a decoding path are being researched.

DISCLOSURE OF INVENTION

Technical Problem

Based on the discussions described above, the present disclosure provides an apparatus and a method for effectively detecting a false alarm for decoding success in a wireless communication system.

In addition, the present disclosure provides an apparatus and a method for determining whether decoding of encoded information is successful based on a detection metric in a wireless communication system.

In addition, the present disclosure provides an apparatus and a method for determining whether successive cancellation list (SCL) decoding is successful, by using a detection metric based on an average of path metrics in a wireless communication system.

In addition, the present disclosure provides an apparatus and a method for determining whether to perform decoding based on energy detection in a wireless communication system.

In addition, the present disclosure provides an apparatus and a method for determining whether to perform decoding based on a signal-to-noise ratio (SNR) measurement value of a received signal in a wireless communication system.

Solution to Problem

According to various embodiments of the present disclosure, an operating method of a receiving node in a wireless communication system may include receiving a signal from a transmitting node, obtaining a plurality of decoding paths by decoding bits contained in the received signal, and determining whether the decoding is successful based on a detection metric determined based on values representing path metrics of the plurality of the decoding paths.

According to various embodiments of the present disclosure, an apparatus of a receiving node in a wireless communication system includes a transceiver, and at least one processor. The transceiver may receive a signal from a transmitting node, and obtain a plurality of decoding paths by decoding bits contained in the received signal, and the at least one processor may determine whether the decoding is successful based on a detection metric determined based on values representing path metrics of the plurality of the decoding paths.

Advantageous Effects of Invention

An apparatus and a method according to various embodiments of the present disclosure may provide a more stable detection metric to determine whether decoding of encoded information is successful, and thus reduce an occurrence rate of a false alarm.

In addition, an apparatus and a method according to various embodiments of the present disclosure may determine whether to perform decoding based on energy detection of a received signal, and thus prevent block error rate (BLER) loss and reduce a rate of false alarms.

Effects obtainable from the present disclosure are not limited to the above-mentioned effects, and other effects which are not mentioned may be clearly understood by those skilled in the art of the present disclosure through the following descriptions.

BEST MODE FOR CARRYING OUT THE INVENTION

Figure 1:
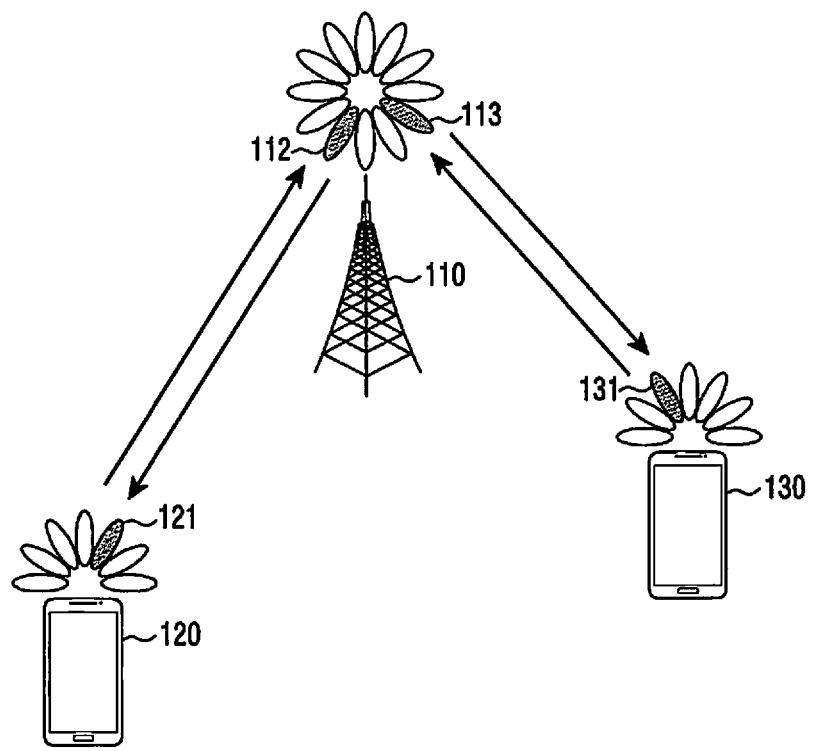
FIG. 1 illustrates a wireless communication system according to various embodiments of the present disclosure.

Terms used in the present disclosure are used for describing particular embodiments, and may not intend to limit the scope of other embodiments. A singular form may include a plurality of forms, unless it is explicitly differently represented. All the terms used herein, including technical and scientific terms, may have the same meanings as terms generally understood by those skilled in the art to which the present disclosure pertains. Among terms used in the present disclosure, the terms defined in a general dictionary may be interpreted to have the same or similar meanings with the context of the relevant art, and, unless explicitly defined in this disclosure, it shall not be interpreted ideally or excessively as formal meanings. In some cases, even terms defined in the present disclosure should not be interpreted to exclude the embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

Hereinafter, the present disclosure relates to an apparatus and a method for detecting a false alarm related to whether decoding is successful in a wireless communication system. Specifically, the present disclosure describes a technique for determining whether decoding is successful by using a detection metric including an average of path metrics of a plurality of decoding paths in the wireless communication system, and determining whether to perform decoding based on energy detection of a received signal.

Terms indicating network entities, terms indicating components of a device, terms indicating metrics (e.g., a detection metric, a path metric, etc.) for determining whether decoding is successful, which are used in the following descriptions, are for the sake of explanations. Accordingly, the present disclosure is not limited to the terms to be described, and may use other terms having technically identical or similar meaning.

In this disclosure, to determine whether a specific condition is satisfied or fulfilled, expressions such as greater than or less than are used by way of example and expressions such as greater than or equal to or less than or equal to are not excluded. A condition defined with greater than or equal to may be replaced by greater than, a condition defined with less than or equal to may be replaced by less than, and a condition defined with greater than or equal to and less than may be replaced by greater than and less than or equal to.

In addition, the present disclosure describes various embodiments using terms used in some communication standard (e.g., 3rd generation partnership project (3GPP)), which are merely exemplary for explanations. Various embodiments of the present disclosure may be easily modified and applied in other communication systems.

FIG. 1 illustrates a wireless communication system according to various embodiments of the present disclosure. FIG. 1 depicts a base station 110, and terminals 120 and 130, as some of nodes which use a radio channel in the wireless communication system. While FIG. 1 depicts only one base station, other base station which is identical or similar to the base station 110 may be further included.

The base station 110 is a network infrastructure for providing radio accesses to the terminals 120 and 130. The base station 110 has coverage defined as a specific geographical area based on a signal transmission distance. The base station 110 may be referred to as, besides the base station, an 'access point (AP)', an eNodeB (eNB)', a '5th generation node (5G node)', a 'gNodeB (gNB)', a 'wireless point', a 'transmission/reception point (TRP)', or other terms having technically identical meaning.

The terminal 120 and the terminal 130 each are a device used by a user, and communicate with the base station 110 over a radio channel. In some cases, at least one of the terminal 120 and the terminal 130 may operate without user's involvement. That is, at least one of the terminal 120 and the terminal 130 is a device which performs machine type communication (MTC), and may not be carried by the user. The terminal 120 and the terminal 130 each may be referred to as, besides the terminal, a 'user equipment (UE)', a 'mobile station', a 'subscriber station', a 'remote terminal', a 'wireless terminal', or a 'user device', or other term having a technically equivalent meaning.

The base station 110, the terminal 120, and the terminal 130 may transmit and receive radio signals in a millimeter wave (mmWave) band (e.g., 28 GHz, 30 GHz, 38 GHz, 60 GHz). In so doing, to improve a channel gain, the base station 110, the terminal 120, and the terminal 130 may conduct beamforming. Herein, the beamforming may include transmit beamforming and receive beamforming. That is, the base station 110, the terminal 120, and the terminal 130 may apply directivity to a transmit signal or a received signal. For doing so, the base station 110 and the terminals 120 and 130 may select serving beams 112, 113, 121, and 131 through a beam search or beam management procedure. After the serving beams 112, 113, 121, and 131 are selected, communications may be performed using resources which are quasi co-located (QCL) with resources which transmit the serving beams 112, 113, 121, and 131.

If large-scale properties of a channel which carries a symbol on a first antenna port may be inferred from a channel which carries a symbol on a second antenna port, the first antenna port and the second antenna port may be said to be QCL. For example, the large-scale properties may include at least one of delay spread, Doppler spread, Doppler shift, average gain, average delay, and spatial receiver parameter.

Figure 2:
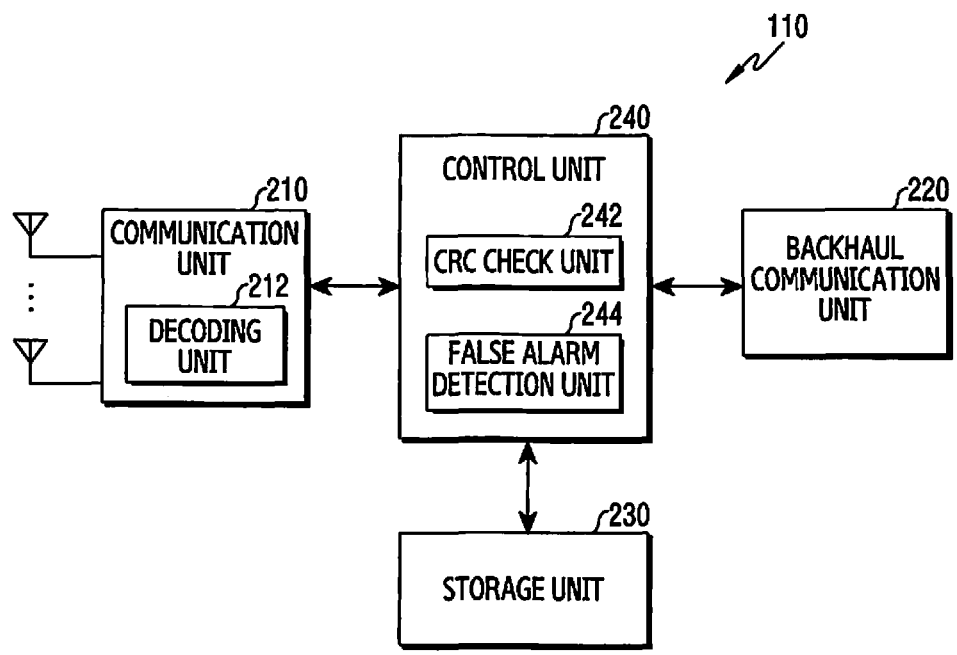
FIG. 2 illustrates a configuration of a base station in a wireless communication system according to various embodiments of the present disclosure.

FIG. 2 illustrates a configuration of a base station in a wireless communication system according to various embodiments of the present disclosure. The configuration in FIG. 2 may be understood as the configuration of the base station 110. A term such as '~unit' or '~er' used hereafter indicates a unit for processing at least one function or operation, and may be implemented using hardware, software, or a combination of hardware and software.

Referring to FIG. 2, the base station includes a communication unit 210, a backhaul communication unit 220, a storage unit 230, and a control unit 240.

The communication unit 210 may perform functions for transmitting and receiving signals over a radio channel. For example, the communication unit 210 performs a conversion function between a baseband signal and a bit stream according to a physical layer standard of the system. For example, in data transmission, the communication unit 210 generates complex symbols by encoding and modulating a transmit bit stream. Also, in data reception, the communication unit 210 restores a receive bit stream by demodulating and decoding a baseband signal. Also, the communication unit 210 up-converts the baseband signal to a radio frequency (RF) band signal, transmits it via an antenna, and down-converts an RF band signal received via an antenna to a baseband signal.

For doing so, the communication unit 210 may include a transmit filter, a receive filter, an amplifier, a mixer, an oscillator, a digital to analog convertor (DAC), an analog to digital convertor (ADC), and so on. In addition, the communication unit 210 may include a plurality of transmit and receive paths. Further, the communication unit 210 may include at least one antenna array including a plurality of antenna elements. In terms of the hardware, the communication unit 210 may include a digital unit and an analog unit, and the analog unit may include a plurality of sub-units according to an operating power and an operating frequency.

The communication unit 210 transmits and receives the signals as stated above. Hence, the communication unit 210 may be referred to as a 'transmitter', a 'receiver', or a 'transceiver'. Also, in the following, the transmission and the reception over the radio channel is used as the meaning which embraces the above-stated processing of the communication unit 210. In addition, the communication unit 210 may further include a backhaul communication unit for communication with other network entity connected over a backhaul network.

The communication unit 210 includes a decoding unit 212 for decoding a received signal. According to various embodiments, the decoding unit 212 may perform the decoding by using a successive cancellation list (SCL) scheme. Although not depicted in FIG. 2, the communication unit 210 may include an encoding unit to perform encoding.

The backhaul communication unit 220 provides an interface for communicating with other nodes in the network. That is, the backhaul communication unit 220 converts a bit sting transmitted from the base station to other node, for example, to other access node, other base station, an upper node, or a core network, to a physical signal, and converts a physical signal received from the other node to a bit stream.

The storage unit 230 stores a basic program for operating the base station, an application program, and data such as setting information. The storage unit 230 may include a volatile memory, a non-volatile memory, or a combination of a volatile memory and a non-volatile memory. The storage unit 230 provides the stored data at a request of the control unit 240. According to various embodiments, the storage unit 230 may store a threshold of a detection metric for determining whether the decoding is successful and thresholds determined to reject a false alarm based on energy detection.

The control unit 240 controls general operations of the base station. For example, the control unit 240 transmits and receives signals through the communication unit 210 or the backhaul communication unit 220. Also, the control unit 240 records and reads data in and from the storage unit 230. For doing so, the control unit 240 may include at least one processor, or may be a part of the processor. In other words, the control unit 240 may control an operation of each component included in the communication unit 210. Also, the control unit 240 may determine whether to perform the decoding based on a channel quality (e.g., a signal-to-noise ratio (SNR) of the received signal). Also, the control unit 240 may determine whether to perform the decoding based on the energy detection.

According to various embodiments, the control unit 240 includes a cyclic redundancy check (CRC) check unit 242 and a false alarm detection unit 244. The CRC check unit 242 may perform CRC check on a plurality of decoding paths determined by decoding by the decoding unit 212. The false alarm detection unit 244 may determine whether the decoding is successful or not with respect to decoding paths which pass the CRC check by the CRC check unit 242, by using a detection metric using an average of path metrics of the plurality of the decoding paths determined by the decoding unit 212. As above, it has been described that the check unit 242 and the false alarm detection unit 244 are included in the control unit 240, but the check unit 242 and the false alarm detection unit 244 may be included in the communication unit 210, according to various embodiments. According to various embodiments, the control unit 240 may control the base station to perform operations according to various embodiments to be described later.

Figure 3:
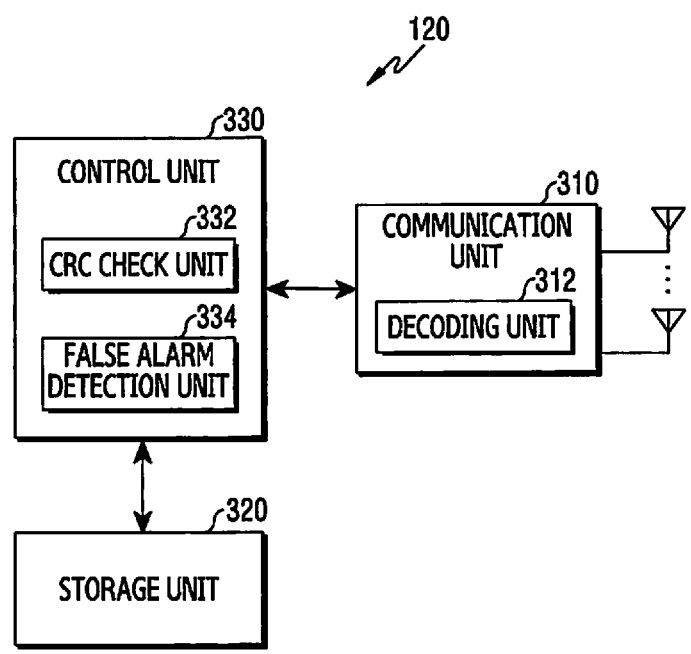
FIG. 3 illustrates a configuration of a terminal in a wireless communication system according to various embodiments of the present disclosure.

FIG. 3 illustrates a configuration of a terminal in a wireless communication system according to various embodiments of the present disclosure. The configuration illustrated in FIG. 3 may be understood as the configuration of the terminal 120. A term such as '~unit' or '~er' used hereafter indicates a unit for processing at least one function or operation, and may be implemented using hardware, software, or a combination of hardware and software.

Referring to FIG. 3, the terminal includes a communication unit 310, a storage unit 320, and a control unit 330.

The communication unit 310 performs functions for transmitting and receiving signals over a radio channel. For example, the communication unit 310 performs a conversion function between a baseband signal and a bit stream according to a physical layer standard of the system. For example, in data transmission, the communication unit 310 generates complex symbols by encoding and modulating a transmit bit stream. Also, in data reception, the communication unit 310 restores a receive bit stream by demodulating and decoding a baseband signal. Also, the communication unit 310 up-converts the baseband signal to an RF band signal and transmits it via an antenna, and down-converts an RF band signal received via the antenna to a baseband signal.

For doing so, the communication unit 310 may include a transmit filter, a receive filter, an amplifier, a mixer, an oscillator, a DAC, an ADC, and the like. Also, the communication unit 310 may include a plurality of transmit and receive paths. Further, the communication unit 310 may include at least one antenna array including a plurality of antenna elements. In view of the hardware, the communication unit 310 may include a digital circuit and an analog circuit, and the analog unit may include a plurality of sub-units according to an operating power, an operating frequency, and so on.

The communication unit 310 transmits and receives the signals as stated above. Hence, the communication unit 310 may be referred to as a 'transmitter', a 'receiver', or a 'transceiver'. In addition, the transmission and the reception over the radio channel are used as the meaning which embraces the above-stated processing of the communication unit 310 in the following explanations. In addition, the communication unit 310 may further include a backhaul communication unit for communication with other network entity connected over a backhaul network.

The communication unit 310 includes a decoding unit 312 for decoding a received signal. According to various embodiments, the decoding unit 212 may perform the decoding by using the SCL scheme. Although not depicted in FIG. 3, the communication unit 310 may include an encoding unit to perform encoding.

The storage unit 320 stores a basic program for operating the base station, an application program, and data such as setting information. The storage unit 320 may include a volatile memory, a non-volatile memory or a combination of a volatile memory and a non-volatile memory. The storage unit 320 provides the stored data according to a request of the control unit 330. According to various embodiments, the storage unit 320 may store a threshold of a detection metric for determining whether decoding is successful and thresholds determined to remove a false alarm based on energy detection.

The control unit 330 controls general operations of the base station. For example, the control unit 330 transmits and receives signals through the communication unit 310. Also, the control unit 330 records and reads data in and from the storage unit 320. For doing so, the control unit 330 may include at least one processor or microprocessor, or may be part of a processor. In other words, the control unit 330 may control the operation of each component included in the communication unit 310. Also, the control unit 330 may determine whether to perform the decoding based on a channel quality (e.g., an SNR of a received signal). Also, the control unit 330 may determine whether to perform the decoding based on energy detection.

According to various embodiments, the control unit 330 includes a CRC check unit 332 and a false alarm detection unit 334. The CRC check unit 332 may perform CRC check on a plurality of decoding paths determined by performing decoding by the decoding unit 312. The false alarm detection unit 334 may use a detection metric using an average of path metrics of the plurality of decoding paths determined by the decoding unit 312, and thus determine whether the decoding is successful with respect to decoding paths determined by the decoding unit 312 and decoding paths passing the CRC check by the CRC check unit 332. As above, it has been described that the check unit 332 and the false alarm detection unit 334 are included in the control unit 330, but the check unit 332 and the false alarm detection unit 334 may be included in the communication unit 310, according to various embodiments. According to various embodiments, the control unit 330 may control the terminal to perform operations according to various embodiments to be described later.

In the following descriptions, the present disclosure refers to a device which performs the encoding as a transmitting node, and a device which performs decoding as a receiving node. For example, in downlink communication, the transmitting node may be understood as a base station (e.g., the base station 110), and the receiving node may be understood as a terminal (e.g., the terminal 120 or the terminal 130), and in uplink communication, the transmitting node may be understood as a terminal (e.g., the terminal 120 or the terminal 130) and the receiving node may be understood as a base station (e.g., the base station 110).

If the SCL decoding scheme using the CRC is used in the wireless communication system, there is a false alarm in which decoding success is determined because a received signal passes the CRC check even though a transmit signal does not exist. A detection metric may be used as a criterion for determining whether the decoding is successful for reducing a false alarm rate. In particular, if the SCL decoding scheme using the CRC is used, the detection metric may be configured by utilizing L-ary path metrics finally determined. Since the path metric reflects reliability of each path if the decoding is performed and may be used to detect whether the decoding is successful, at least one path metric may be used as a variable for determining the detection metric. In this case, it is required to use a more stable metric, and at the same time to provide a detection metric which minimizes block error rate (BLER) loss accompanied if the false alarm rate is reduced.

Figure 4:
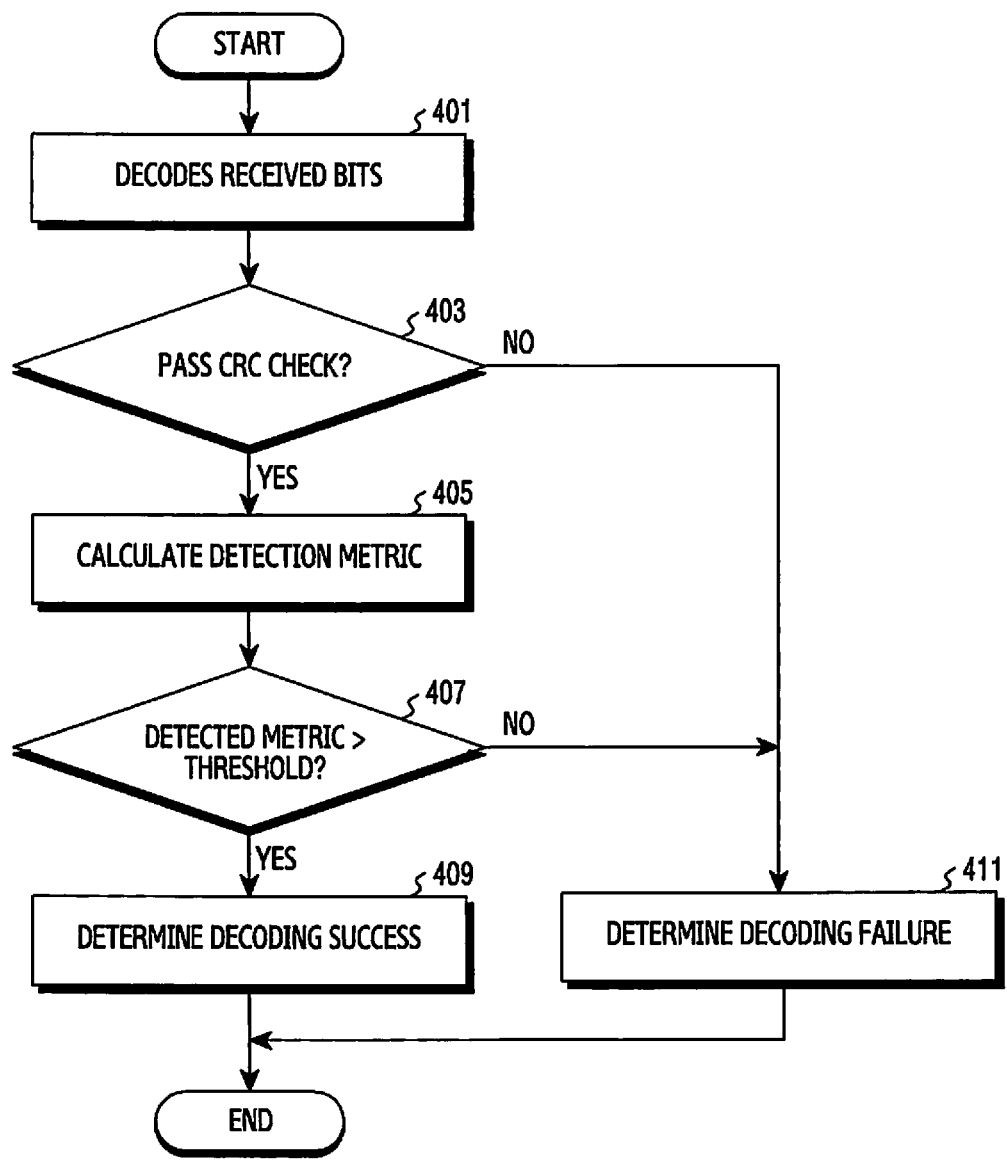
FIG. 4 is a flowchart of a receiving node for determining whether decoding is successful based on a detection metric in a wireless communication system according to various embodiments of the present disclosure.

FIG. 4 is a flowchart of a receiving node for determining whether decoding is successful based on a detection metric in a wireless communication system according to various embodiments of the present disclosure. FIG. 4 illustrates an operating method of a base station 110, a terminal 120, or a terminal 130 as operations of the receiving node.

Referring to FIG. 4, in step 401, the receiving node decodes received bits. According to various embodiments, data encoded with a polar code and added with a CRC code may be transmitted from the transmitting node. Hence, the receiving node may perform SCL (CRC aided SCL, CA-SCL) decoding using the CRC on the data, and in this case, decoding is performed on a bit basis.

In step 403, the receiving node determines whether the decoded bits pass the CRC check. According to various embodiments, if the SCL decoding using the CRC is performed, the receiving node may perform the CRC check on L-ary decoding paths finally determined.

If the decoded bits do not pass the CRC check, in step 411, the receiving node determines that the decoding fails. That is, the receiving node removes at least one decoding path not passing the CRC check among the L-ary decoding paths. Thus, the receiving node may not consider a bit stream indicated by the removed decoding path anymore.

If the decoded bits pass the CRC check, in step 405, the receiving node calculates a detection metric for the decoded paths passing the CRC check. The detection metric may be used as an index for determining whether the CRC check is passed because the decoding of the received bits is successful. For example, if the SCL decoding using the CRC is performed, the detection metric may be determined based on a value representing the path metrics of the plurality of the decoding paths which are finally determined. Specifically, the detection metric may be configured based on a value intermediately representing the path metrics. According to various embodiments, the detection metric may be expressed in inverse proportion to the value intermediately representing the plurality of the path metrics. That is, in the detection metric, the value intermediately representing the plurality of the path metrics may be used as a criterion for normalization. In an example, an average of the plurality of the path metrics may be used as the criterion for the normalization. In another example, a median of the plurality of the path metrics may be used as the criterion for the normalization.

If the average value of the plurality of the path metrics is used as the criterion for the normalization, the detection metric may be determined as shown in <Equation 1> below.

$$DM = \frac{|PM_{max} - PM_{min}^{CRC}|}{PM_{average}} \quad \text{[Equation 1]}$$

In <Equation 1>, DM denotes the detection metric, $PM_{max}$ denotes a maximum value among the decoding path metrics of the L-ary paths, $PM_{min}^{CRC}$ denotes a minimum value among the path metrics of the decoding paths passing the CRC check, and $PM_{average}$ denotes the average value of the path metrics of the L-ary decoding paths.

By using the detection metric of <Equation 1>, a deviation between the path metrics may be identified as a rate. For doing so, the receiving node uses the average value $PM_{average}$ of the L-ary path metrics as a variable for normalizing a difference between the path metric $PM_{max}$ of the lowest reliability path among the final L-ary paths and the path metric $PM_{min}^{CRC}$ of the highest reliability path among the paths passing the CRC check regardless of whether the CRC test is passed. This is because the average of the path metrics has a smaller variance than the individual path metric, and accordingly the stable detection metric may be provided.

In step 407, the receiving node determines whether the detection metric exceeds a threshold. According to various embodiments, an optimized threshold may be determined according to at least one of an information bit length k, a code length n, and a code rate k/n.

If the detection metric exceeds the threshold, in step 409, the receiving node determines that the decoding is successful. The great detection metric value means great deviation between the path metric of the decoding path with the lowest reliability among the L-ary decoding paths determined by performing one decoding and the path metric of the decoding path with the highest reliability among the decoding paths passing the CRC check. Hence, since the detection metric greater than the threshold is enough to distinguish the decoding path of the highest reliability from the rest decoding paths, the receiving node may determine that the decoding is successful.

If the detection metric does not exceed the threshold, in step 411, the receiving node determines that the decoding fails. The small detection metric value means small deviation between the path metric of the decoding path with the lowest reliability among the L-ary decoding paths determined by performing one decoding and the path metric of the decoding path with the highest reliability among the decoding paths passing the CRC check. Hence, since the detection metric smaller than the threshold is not enough to distinguish the decoding path of the highest reliability from the rest decoding paths, the receiving node may determine that the decoding fails.

According to various embodiments, the threshold of FIG. 4 may be differently determined based on types of transmitted and received information.

For example, in general, for scheduling to select appropriate setting (e.g., a precoding matrix, a modulation and coding scheme (MCS)) related to downlink transmission according to a downlink channel state, control information such as a rank indicator (RI), a channel quality indicator (CQI) should be transmitted and received. In this case, to control transmission setting for downlink transmission in a given channel, it is required to successfully receive and decode the control information. In addition, control information such as acknowledgment (ACK) and negative ACK (NACK) is transmitted and received to inform whether data is received without error. In this case, it is required to successfully receive and decode the control information such as ACK and NACK, to determine whether the data to be received is successfully received. Thus, comparing with the data, whether the control information is successfully decoded should be determined based on a stricter criterion. Hence, a threshold for the control information may be set to a value greater than the threshold for the data.

In addition, transmission and reception of broadcast information such as a master information block (MIB) must precede the transmission and the reception of the control information. In this case, since the MIB includes setting information for the transmission and reception of the control information, whether the MIB is successfully decoded should be determined accurately. Thus, comparing with the control information, it is necessary to determine whether the MIB is successfully decoded based on a stricter criterion. Hence, a threshold for the MIB may be set to a value greater than the threshold for the control information.

According to various embodiments, to configure the detection metric based on the path metric, the decoding process described in FIG. 4 may be performed through the SCL decoding scheme. As described above, the path metric in performing the SCL decoding may be used as an index indicating reliability of the corresponding decoding path, and may be expressed as <Equation 2> below.

$$PM_l^{(i)} \triangleq \Sigma_{j=0}^{i} \ln(1+\exp(-(1-2\hat{u}_j[l]) \cdot L_n^{(j)}[l])),$$
$$l \in \{1,2,\ldots,L\}, i \in \{0,1,\ldots,N-1\} \quad \text{[Equation 2]}$$

In <Equation 2>, l denotes an index of each path, i denotes an index of each source bit, L denotes a list size, N denotes a code length, $PM_l^{(i)}$ denotes a path metric of an l-th path if an i-th bit is decoded, and $L_n^{(i)}[l]$ denotes a log likelihood ratio (LLR) value of the l-th path if the i-th bit is decoded.

In addition, the LLR value of the l-th path in decoding the i-th bit may be expressed as <Equation 3>.

$$L_n^{(l)}[l] = \ln\left(\frac{w_N^{(l)}(y, \hat{u}_0^{i-1}[l] \mid u_i = 0)}{w_N^{(l)}(y, \hat{u}_0^{i-1}[l] \mid u_i = 1)}\right) \quad \text{[Equation 3]}$$

In <Equation 3>, l denotes the index of each path, i denotes the index of each source bit, $L_n^{(i)}[l]$ denotes an LLR value of the l-th path if the i-th bit is decoded, $\hat{u}_0^{i-1}[l]$ denotes decoded source bits from $u_0$ to $u_{i-1}$ in the l-th path, y denotes a vector of the received signal, and W(y|x) is a probability of channel transition and denotes the probability of receiving y if x is transmitted over a channel W.

For example, if the i-th bit before encoding is 0 and the i-th bit is 0 in the decoding, the value $L_n^{(i)}[l]$ is calculated as a positive number, and if the i-th bit before the encoding is 1 and the i-th bit is 1 in the decoding, the value $L_n^{(i)}[l]$ is calculated as a negative number. Hence, in the above two cases, the value $(1-2\hat{u}_j[l]) \cdot L_n^{(j)}[l]$ is calculated as a positive number. By contrast, if the i-th bit before encoding is 0 and the i-th bit is determined to 1 in the decoding, the value $L_n^{(i)}[l]$ is calculated as a negative number. Accordingly, the value $(1-2\hat{u}_j[l]) \cdot L_n^{(j)}[l]$ is reversed to a negative number. Eventually, if the bit before the encoding is 0, penalties for the path determined to 0 and the path determined to 1 in the decoding may be calculated differently, and greater penalty may be imposed on the path determined to a different bit. The above-described path metric may be updated every time every bit is decoded, which may be expressed as <Equation 4>.

[Equation 4]

$$PM_l^{(i)} = PM_l^{(i-1)} + \ln(1+\exp(-(1-2\hat{u}_j[l]) \cdot L_n^{(j)}[l])) \quad \text{[Equation 4]}$$

In <Equation 4>, l denotes the index of each path, i denotes the index of each source bit, L denotes the list size, N denotes the code length, $\hat{u}_j[l]$ denotes a decoded value of a j-th source bit (0 or 1) stored in the l-th path, $PM_l^{(i)}$ denotes the path metric of the l-th path if the i-th bit is decoded, $PM_l^{(i-1)}$ denotes a path metric of the l-th path if an (i−1)-th bit is decoded, and $L_n^{(i)}[l]$ denotes the LLR value of the l-th path if the i-th bit is decoded.

Hereinafter, an SCL decoding process for determining the final L-ary decoding paths is described with reference to FIG. 5.

Figure 5:
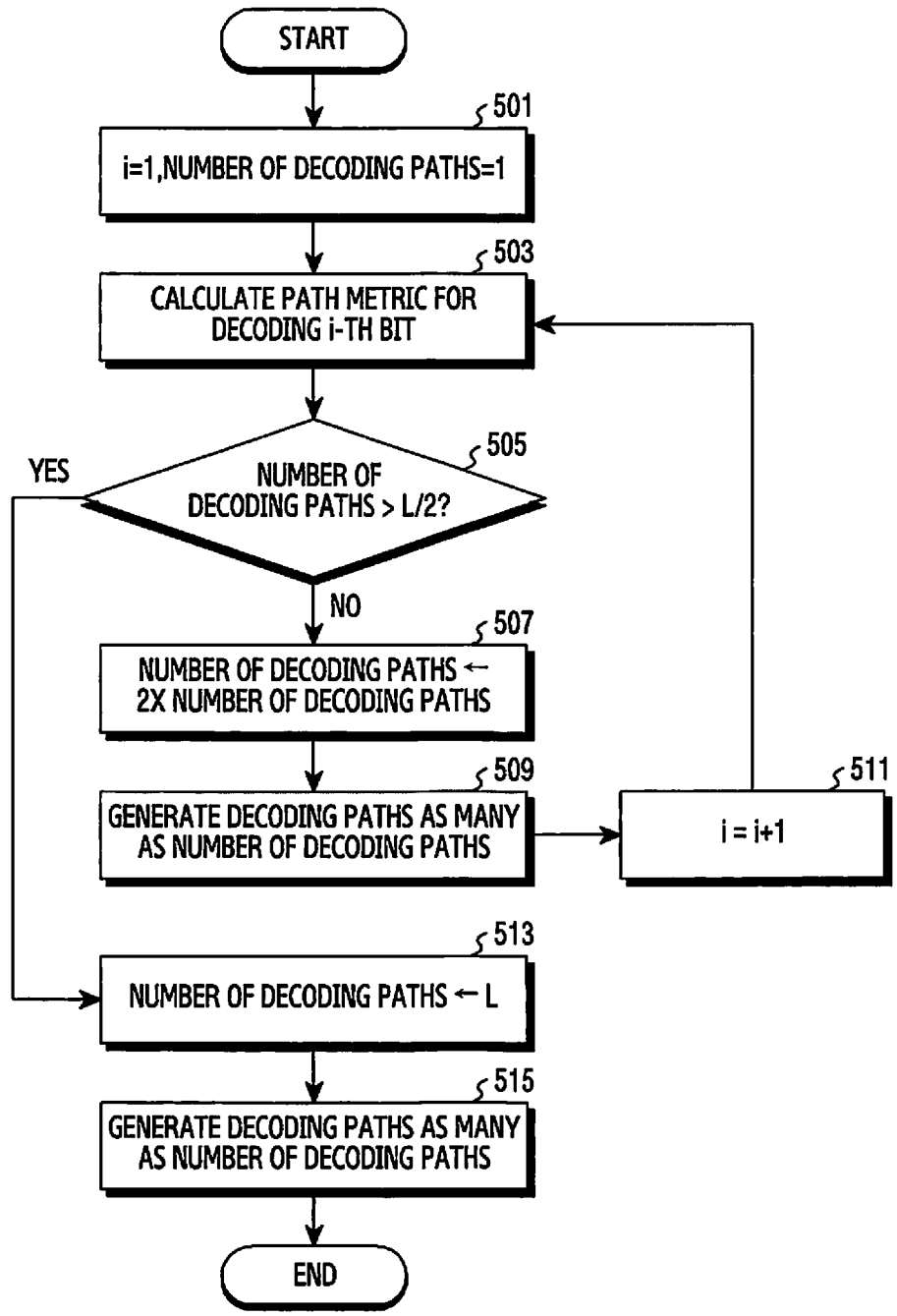
FIG. 5 is a flowchart of a receiving node for performing successive cancellation list (SCL) decoding in a wireless communication system according to various embodiments of the present disclosure.

FIG. 5 is a flowchart of a receiving node for performing SCL decoding in a wireless communication system according to various embodiments of the present disclosure. FIG. 5 illustrates an operating method of a base station 110, a terminal 120, or a terminal 130, in the operations of the receiving node.

Referring to FIG. 5, in step 501, the receiving node sets i to 1. Herein, i means the index of the transmitted bits. Also, the receiving node sets the number of the decoding paths to 1. The decoding path increases by two times as one index is decoded. The receiving node may perform step 503 through step 515 to determine at least one decoding path for a bit corresponding to one index.

In step 503, the receiving node calculates a path metric for decoding the i-th bit. Specifically, if decoding the bit corresponding to the i-th index among the received bits, the receiving node may determine a probability that candidates (e.g., 0 or 1) for becoming the decoded i-th bit value is equal to the value of the i-th bit before encoded at the transmitting node. By determining the probability value, the receiving node may calculate a path metric which is an index indicating reliability of a decoding path for each of the candidates. According to various embodiments, the path metric may be expressed as the LLR.

In step 505, the receiving node identifies whether the number of the decoding paths exceeds L/2. If the number of the decoding paths exceeds L/2, the receiving node performs step 513, and if the number of the decoding paths does not exceed L/2, the receiving node performs step 507. Herein, L denotes the list size which is a reference value predetermined for the number of the decoding paths. By maintaining the number of the decoding paths at L, the receiving node may prevent unlimited increase of decoding computation.

If identifying that the number of the decoding paths does not exceed L/2, in step 507, the receiving node determines the doubled number of the decoding paths as the number of the decoding paths. In this case, even if the number of the decoding paths is doubled, the determined number of the decoding paths may be maintained below L which is the reference value.

In step 509, the receiving node generates decoding paths as many as the determined number of the decoding paths. According to the number of the decoding paths determined in step 507 described above, L or less decoding paths are generated.

In step 511, the receiving node increases the value of the index i by 1 and returns to step 503 to decode a next bit.

If identifying that the number of the decoding paths exceeds L/2, in step 513, the receiving node determines that the number of the decoding paths is L. In this case, since the number of the decoding paths exceeds L if the number of the decoding paths is doubled, the receiving node may maintain the number of the decoding paths at L which is the reference value. According to various embodiments, L-ary decoding paths may be determined from the decoding paths exceeding L according to the size of each path metric value. In this case, since a smaller value of the path metric indicates higher reliability, the receiving node may determine the L-ary decoding paths in ascending order of the path metric.

In step 515, the receiving node generates decoding paths as many as the determined number of the decoding paths. In this case, since the determined number of the decoding paths is L, the receiving node may generate L-ary decoding paths.

As mentioned above, the operations of the receiving node for reducing the false alarm occurrence rate described in FIG. 4 and FIG. 5 are based on the detection metric using the path metric of the decoding path, and may be carried out after the decoding process. Hereinafter, embodiments for further reducing the false alarm occurrence rate by considering a channel quality (e.g., SNR) before performing decoding are described.

In general, detection of a code parameter in a control channel is performed based on blind detection. The receiving node may detect a message by selecting one code $C_i$ from a set $C=\{C_i\}$ including a plurality of codes, and determining whether a received code word corresponds to the selected code. For example, the receiving node determines whether the code $C_i$ is transmitted, by decoding the selected code $C_i$ and performing the CRC check on the decoding result. In this case, since the determination using only the CRC check may raise a false alarm, a false alarm detection method related to the blind detection has been proposed. However, even if the above-stated false alarm detection method is used, a residual false alarm exists, and the receiving node performs complex calculation by performing decoding for each codeword until a code parameter is identified.

To reduce the residual false alarm rate and computational complexity, the receiving node may use an energy of the normalized received signal by considering a noise level before performing the decoding. Hereinafter, for convenience of descriptions, a case in which one code is transmitted and received, and a case in which the transmitted and received signals do not exist are described.

$$H_0: y = z$$

$$H_1: y = x + z \quad \text{[Equation 5]}$$

In <Equation 5>, $H_0$ is the case where a signal does not exist, the receiving node receives a signal y including only a noise z, and $H_1$ is a case where a signal exists, and the receiving node selects a signal including a transmit signal x and the noise z. As described above, validity of the code parameter is determined through the CRC check after the polar code is decoded, but an error undetectable by the receiving node may occur due to imperfection of the CRC code. In this case, a false alarm of determining that the signal is present even though the signal is not transmitted may occur. That is, in the situation $H_0$ in which the transmit signal does not exist, a decoding result may pass the CRC check. Hereinafter, an embodiment for reducing the residual false alarm rate, by determining whether the transmit signal exists through the energy detection of the received signal before the decoding is performed is described with reference to FIG. 6.

Figure 6:
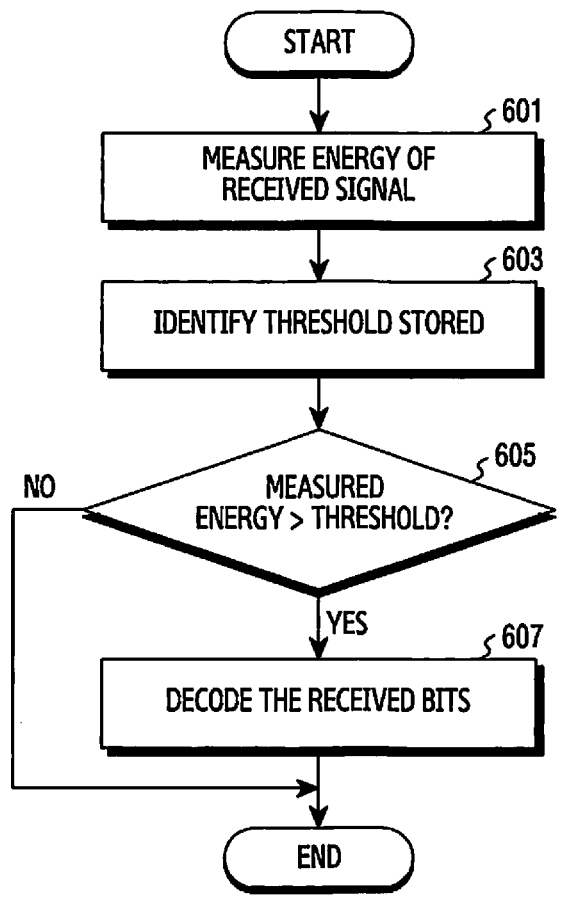
FIG. 6 is a flowchart of a receiving node for determining whether to early terminate based on energy detection before decoding in a wireless communication system according to various embodiments of the present disclosure.

FIG. 6 is a flowchart of a receiving node for determining whether to early terminate based on energy detection before decoding in a wireless communication system according to various embodiments of the present disclosure. FIG. 6 illustrates an operating method of a base station 110, a terminal 120, or a terminal 130 in the operations of the receiving node.

Referring to FIG. 6, in step 601, the receiving node measures energy of a received signal. The receiving node may receive the signal transmitted from the transmitting node and passing through a channel, and measure the energy of the received signal. According to various embodiments, the receiving node may normalize an average energy of the received signal by using a standard deviation of noise. In this case, the normalized energy of the signal may be referred to as an energy metric. According to various embodiments, the receiving node may measure an SNR of the channel.

In step 603, the receiving node identifies a stored threshold. According to various embodiments, the threshold may be determined based on an SNR value required for each specific code rate, and stored. That is, thresholds corresponding to a plurality of SNRs respectively may be predefined. The receiving node identifies a threshold corresponding to a code rate of the signal, among the stored thresholds. Specifically, the receiving node detects the energy of the received signal, and compares the detected energy with a threshold determined by considering an operating SNR range. Herein, the receiving node may determine a code rate of the signal according to a type of information to receive.

In step 605, the receiving node identifies whether the measured energy exceeds a threshold. More specifically, the receiving node may compare a threshold corresponding to the SNR for achieving a target value of the BLER according to the predetermined code length and code rate with the measured energy. Alternatively, according to various embodiments, the receiving node may identify whether the energy metric obtained from the measured energy exceeds the threshold. Alternatively, the receiving node may compare the measured SNR with the threshold. If the energy metric does not exceed the threshold, the receiving node may determine early termination without decoding the received signal. The energy metric not exceeding the threshold means that the energy of the received signal is smaller than the threshold corresponding to the SNR for achieving the BLER target value according to the predetermined code length and code rate. Accordingly, the receiving node may determine that the transmitted signal does not exist, and thus does not decode the received signal.

If the measured energy exceeds the threshold, in step 607, the receiving node performs decoding. According to various embodiments, the receiving node may determine that an energy metric obtained from the measured energy exceeds the threshold. Alternatively, the receiving node may determine that the measured SNR exceeds the threshold. In this case, the measured energy exceeding the threshold means that the energy of the received signal is greater than the threshold corresponding to the SNR for achieving the BLER target value according to the predetermined code length and code rate. Hence, by determining that the transmitted signal exists, the receiving node may decode the received signal.

As described in FIG. 6, through the energy detection of the received signal, the receiving node early terminates without performing the decoding process and the CRC check if the transmit signal does not exist, and thus block the CRC check passing even if the transmit signal does not exist. However, if the energy of the received signal is smaller than the threshold even though the transmit signal exists, the receiving node does not decode a signal which is decodable and thus degrade the BLER. Hence, the above-described method based on the energy detection may use an appropriate threshold for reducing the false alarm occurrence rate while minimizing BLER loss. Hereinafter, a criterion for determining the threshold is described with reference to FIG. 7.

In communication to which the channel code is applied, there is an operating SNR range suitable for the code to operate, which generates a BLER below a specific value. If the receiving node may estimate noise variance with high accuracy, the receiving node may normalize the noise by dividing the received signal by standard deviation of the noise. In this case, energy distribution of the received signal in the situation $H_0$ where the transmit signal does not exist and energy of the received signal in the situation $H_1$ where the transmit signal exists show different distributions, and an invalid received signal may be filtered out using different energy distributions.

For example, the receiving node may detect an average energy of the received signal, and determine the situation $H_0$ if the energy distribution does not exceed a threshold. By contrast, if the average energy distribution of the received signal exceeds the threshold, the receiving node may determine the situation $H_1$. That is, the receiving node may distinguish between the situation $H_0$ and the situation $H_1$ by considering the operating SNR range through the energy detection of the received signal.

Figure 7:
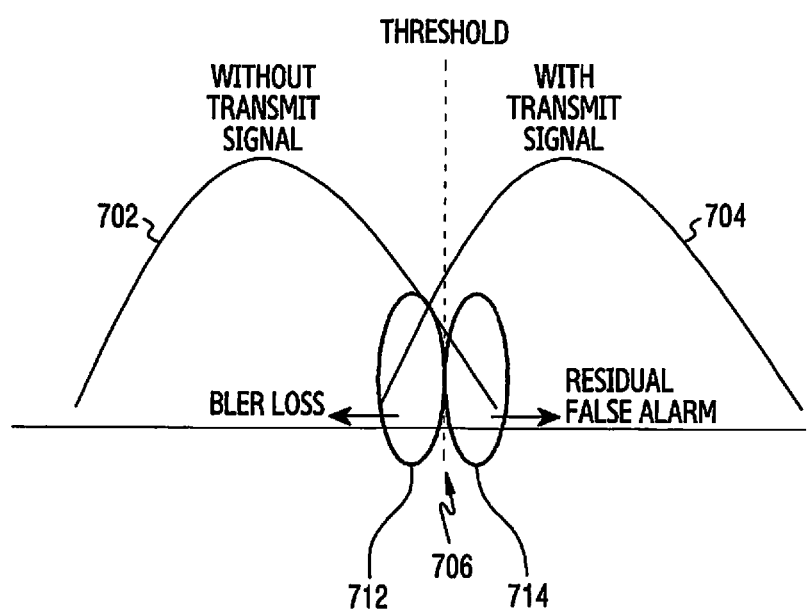
FIG. 7 illustrates an example of threshold selection for determining whether to early terminate in a wireless communication system according to various embodiments of the present disclosure.

FIG. 7 illustrates an example of threshold selection for determining whether to terminate early in a wireless communication system according to various embodiments of the present disclosure.

Referring to FIG. 7, a curve 702 indicates an average energy distribution of a received signal measured by the receiving node, if there is no transmit signal. In this case, the average energy of the signal measured by the receiving node follows a central chi-square distribution of degree $2 n_s$ if the number of symbols is $n_s$, and exhibits a form approximate to a distribution as the degree increases.

As described above, the false alarm is defined as determining the decoding success as the received signal passes the CRC check even though the transmit signal does not exist. The threshold should be determined to a value which reduces the occurrence rate of such a false alarm. By contrast, if the transmit signal is present, the threshold should be determined to a value for reducing the BLER loss. Hence, if the threshold is determined to remove the false alarm in the situation where the transmit signal does not exist, there is a trade-off in which the false alarm rate decreases and concurrently the BLER loss occurs in the situation where the transmit signal is present.

Referring to FIG. 7, early termination may be determined for a received signal having energy less than a specific threshold 706. In this case, since a portion 712 having an energy smaller than a threshold 706 in a curve 704 does not pass through the decoding process even though the transmit signal exists, BLER loss may occur for the portion 712. By contrast, since a portion 714 having an energy greater than the threshold 706 in the curve 702 passes the CRC test through the decoding process even though the transmit signal does not exist, a false alarm may still exist for the portion 714, which is referred to as a residual false alarm.

As described above, the energy distribution of the signal if the transmit signal does not exist approximately follows $$N\left(1, \frac{1}{\sqrt{n_s}}\right).$$

In this case, the portion 714 represents a rate of the portion including the residual false alarm with respect to the curve 702, and the residual false alarm rate may be expressed as <Equation 6>.

$$FAR_{res} = Q\left(\frac{T-1}{1/\sqrt{n_s}}\right) \quad \text{[Equation 6]}$$

In <Equation 6>, $FAR_{res}$ denotes the residual false alarm rate, T denotes a threshold, $\gamma$ denotes a linear SNR value, and $n_s$ denotes the number of modulation symbols.

Referring to FIG. 7, the curve 704 represents the average energy distribution of the received signal measured by the receiving node if the transmit signal is present. In this case, a symbol energy of the signal measured by the receiving node follows a non-central chi-square distribution. Also, the energy distribution exhibits a form approximate to the normal distribution $$N\left(1+\gamma, \frac{1+2\gamma}{n_s}\right)$$

as the order increases.

In addition, the portion 712 represents the rate of the portion where the BLER loss occurs with respect to the curve 704, and the BLER loss may be expressed as <Equation 7>.

$$L_{BLER} = Q\left(\frac{1+\gamma-T}{\sqrt{(1+2\gamma)/n_s}}\right) \quad \text{[Equation 7]}$$

In <Equation 7>, $L_{BLER}$ denotes the BLER loss rate, T denotes the threshold, $\gamma$ denotes the linear SNR value, and $n_s$ denotes the number of the modulation symbols.

Polyanskiy-poor-verdu (PPV) normal approximation may be utilized to obtain a relationship between the BLER and the SNR for a specific code rate and to determine a lower bound for the BLER. The PPV normal approximation may be defined as <Equation 8>.

$$R_{NA} = C(\gamma) - \log_2 e Q^{-1}(P_e)\sqrt{\frac{\gamma(2+\gamma)}{2n(1+\gamma)^2}} + \frac{\log_2(n)}{2n} C(\gamma) = \quad \text{[Equation 8]}$$
$$\frac{1}{2}\log(1+\gamma)$$

In <Equation 8>, $R_{NA}$ denotes the code rate, $P_e$ denotes a target BLER, n denotes the code length, and $\gamma$ denotes the linear SNR value. In addition, if the code length n and the code rate $R_{NA}$ are predetermined, <Equation 8> may be expressed as <Equation 9> for the BLER.

$$P_e = \frac{-R_{NA} + C(\gamma) + \frac{\log_2(n)}{2n}}{\sqrt{\frac{\gamma(2+\gamma)}{2n(1+\gamma)^2}} \log_2(e)} \quad \text{[Equation 9]}$$

In <Equation 9>, $P_e$ denotes the target BLER, $R_{NA}$ denotes the code rate, n denotes the code length, and $\gamma$ denotes the linear SNR value. Hence, if the code length and the code rate are predetermined, the target BLER value may be obtained through <Equation 9>. In this case, a target SNR value corresponding to the target BLER value may be determined, and a threshold corresponding to the target SNR value may be expressed as <Equation 10>.

$$T = 1+\gamma^* - Q^{-1}(\alpha P_e)\cdot\sqrt{(1+2\gamma^*)/n_s} \quad \text{[Equation 10]}$$

In <Equation 10>, T denotes the threshold, $\gamma^*$ denotes the target SNR value, $n_s$ denotes the number of symbols, $\alpha$ denotes a constant for setting an error occurring based on the energy detection to be sufficiently smaller than an error due to actual coding performance, and $P_e$ denotes the target BLER value.

Referring to <Equation 6> and <Equation 7>, trade-off indicating that as the threshold T of <Equation 10> increases, the residual false alarm rate $FAR_{res}$ indicates a smaller value, and the BLER loss ratio $L_{BLER}$ indicates a greater value is identified. Accordingly, if the SNR target value is given for the predetermined code length and code rate, an appropriate threshold T for the target SNR value may be determined.

According to various embodiments, the target values for $FAR_{res}$ and $L_{BLER}$ may be differently set based on the type of the transmitted and received information.

For example, in general, for scheduling to select an appropriate downlink transmission-related, setting (e.g., a precoding matrix, an MCS) according to a downlink channel state, control information such as a RI, a CQI needs to be transmitted and received. In this case, to control transmission setting for downlink transmission in a given channel, it is required to successfully receive and decode the control information. In addition, control information such as ACK and NACK is transmitted and received to indicate whether data is received without error. In this case, it is required to successfully receive and decode the control information such as ACK and NACK, to determine whether the data to be received is successfully received. Thus, it is required that the residual false alarm rate of the control information have a value smaller than the residual false alarm rate of the data. In this case, the threshold for the control information may be set to a value greater than the threshold for the data.

In addition, transmission and reception of broadcast information such as MIB must precede the transmission and reception of the control information. In this case, since the MIB includes setting information for the transmission and reception of the control information, it needs to accurately determine whether the MIB is successfully decoded. Hence, the residual false alarm rate of the MIB is required to have a value smaller than the residual false alarm rate of the control information. In this case, a threshold for the MIB may be set to a value greater than the threshold for the control information.

According to various embodiments, the method of removing the false alarm of FIG. 4 and FIG. 6 described above may be selectively performed by the receiving node, or sequentially performed, and thus reduce the residual false alarm rate while maintaining performance related to the BLER loss. Hereinafter, an embodiment of false alarm detection using both of the detection metric and the energy detection is described with reference to FIG. 8.

Figure 8:
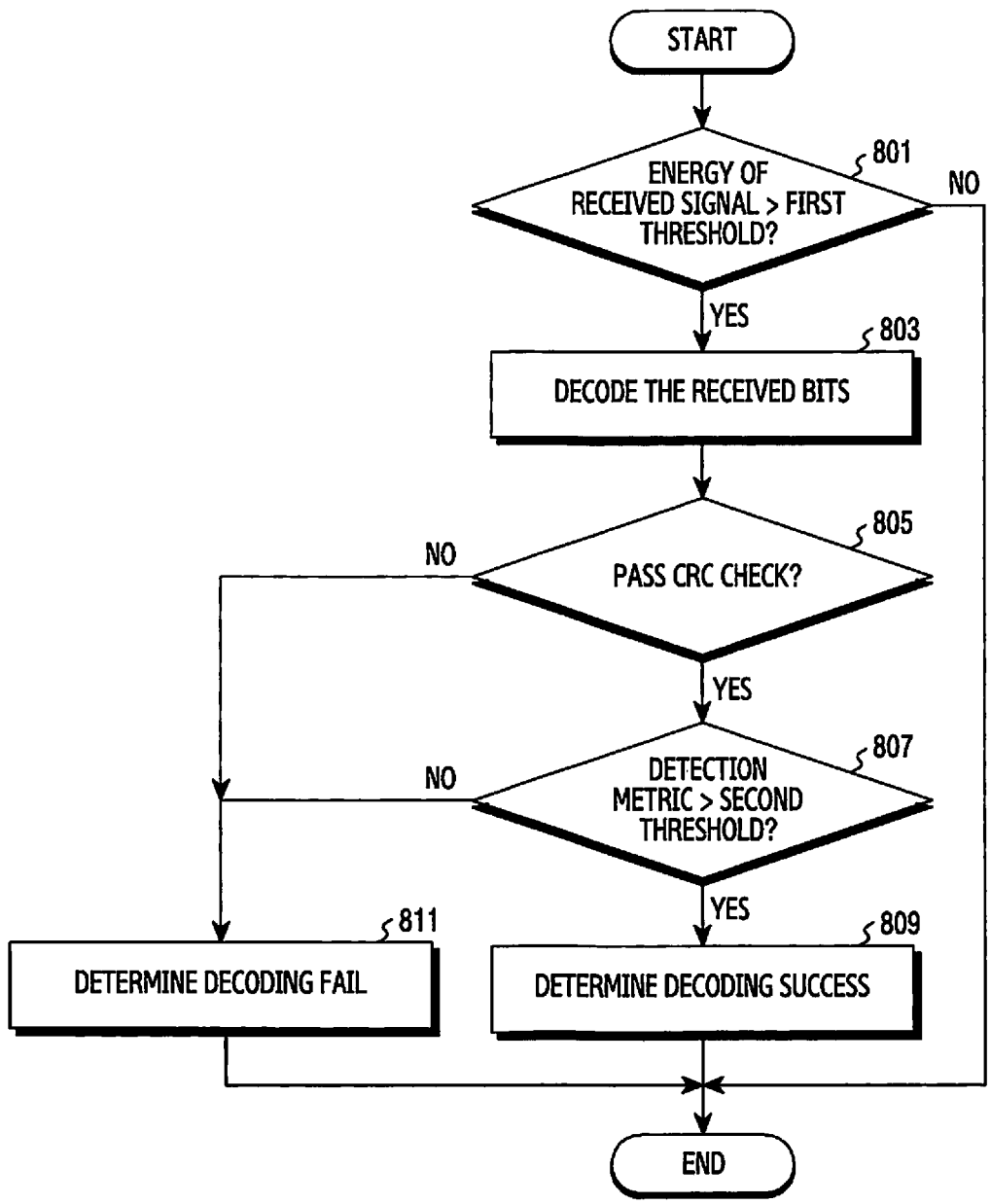
FIG. 8 is a flowchart of a receiving node for detecting a false alarm with respect to decoding success in a wireless communication system according to various embodiments of the present disclosure.
Figure 9A:
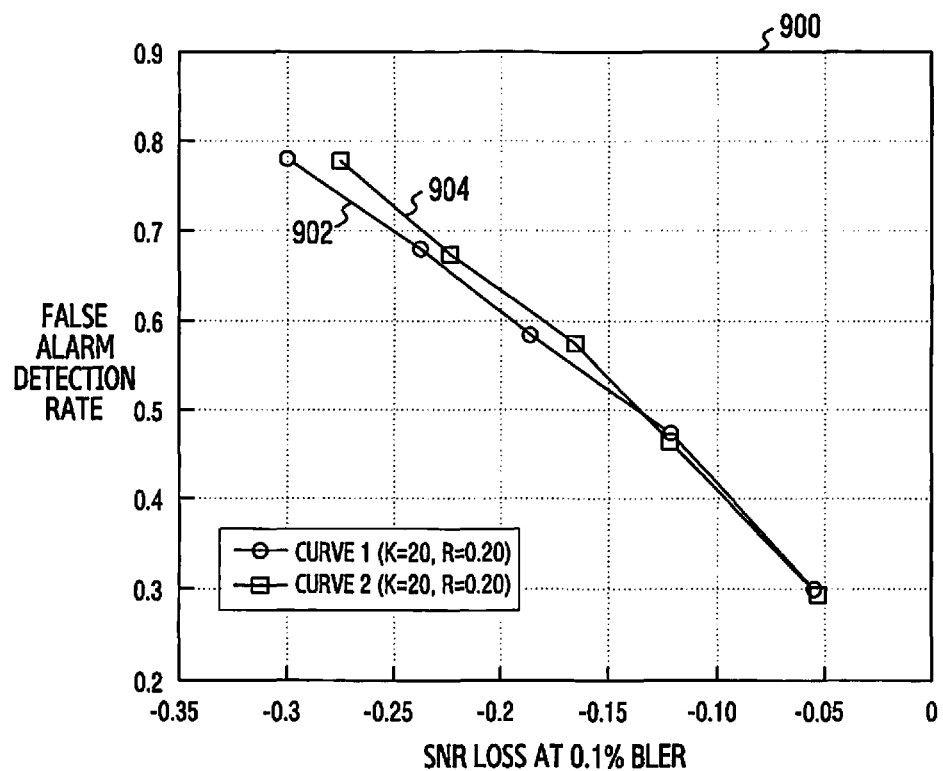
FIG. 9A through FIG. 9C, FIG. 10A and FIG. 10B, and FIG. 11A through FIG. 11D illustrate simulation results of false alarm detection performance based on a detection metric in a wireless communication system according to various embodiments of the present disclosure.
Figure 9B:
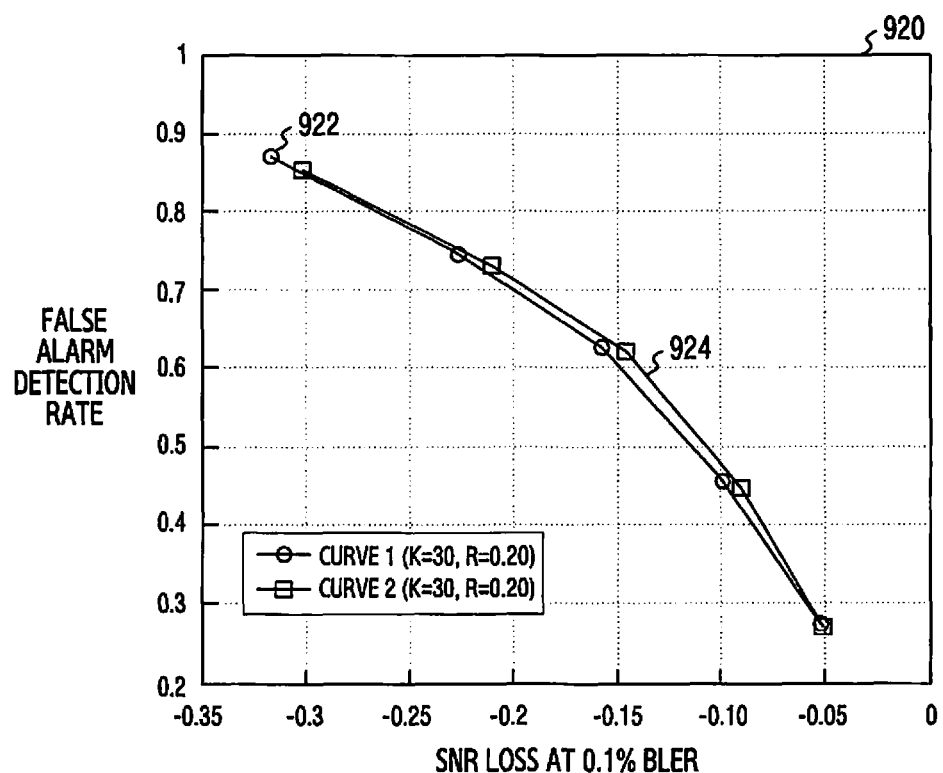
Figure 9C:
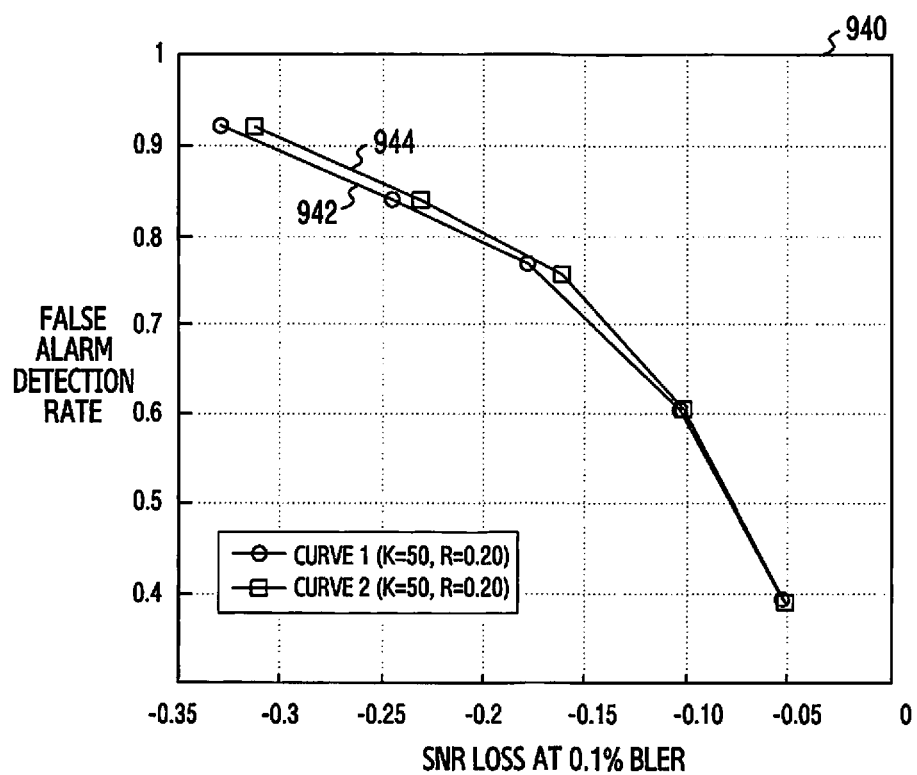
Figure 10A:
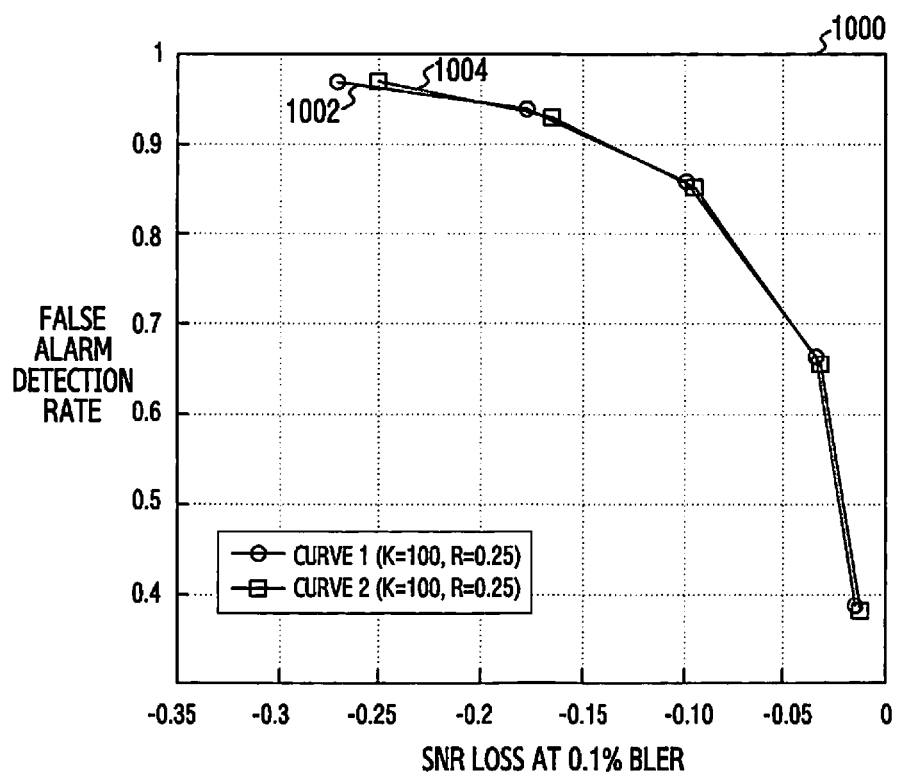
Figure 10B:
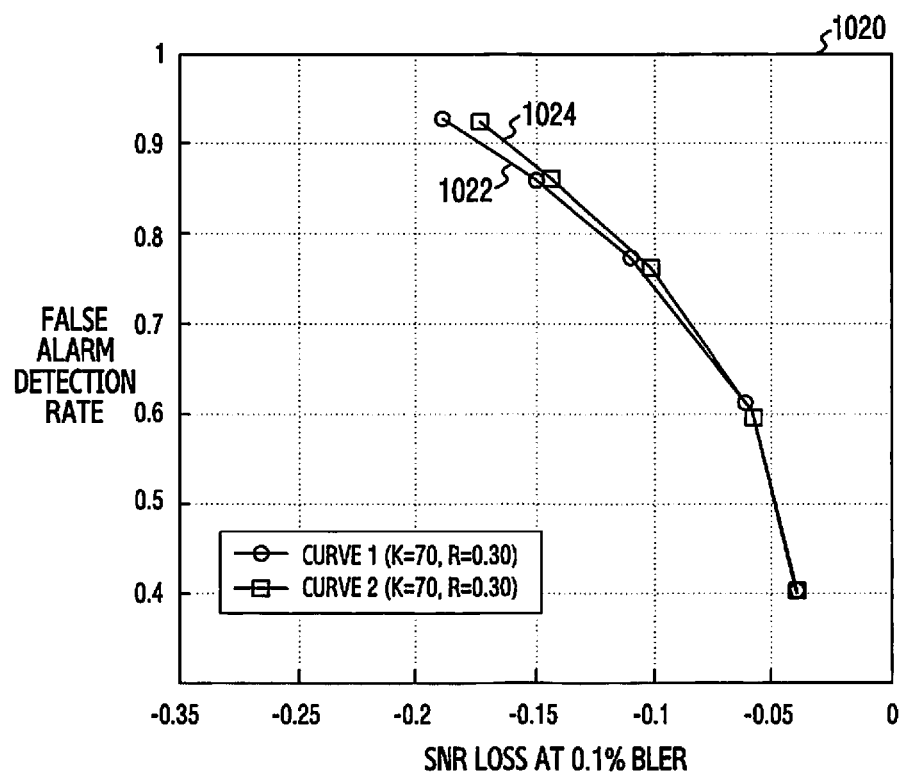
Figure 11A:
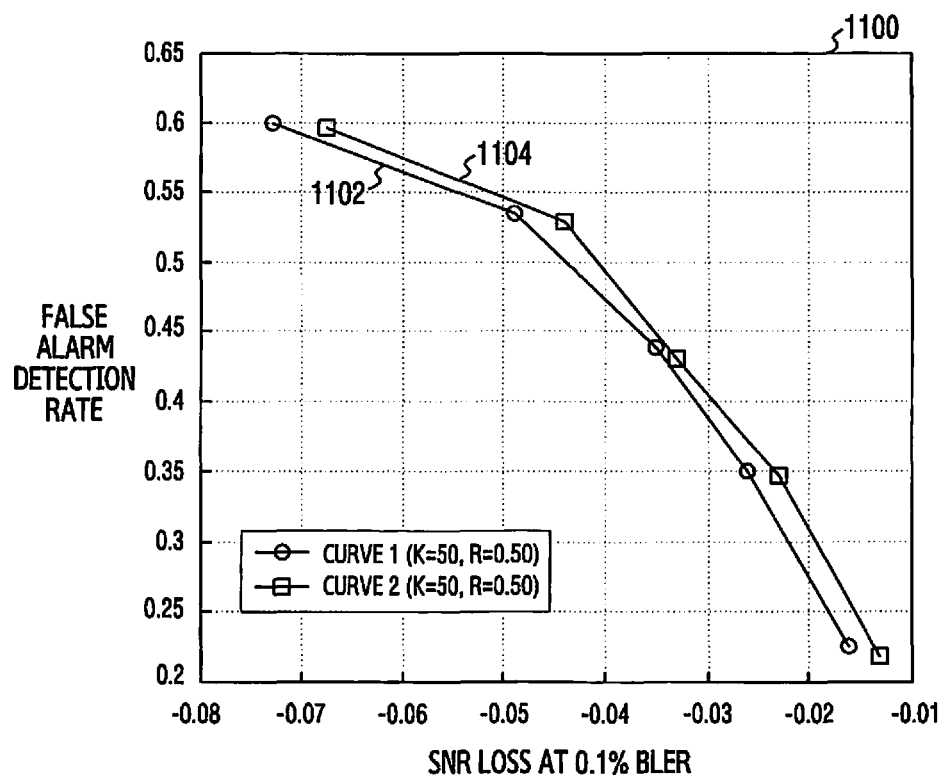
Figure 11B:
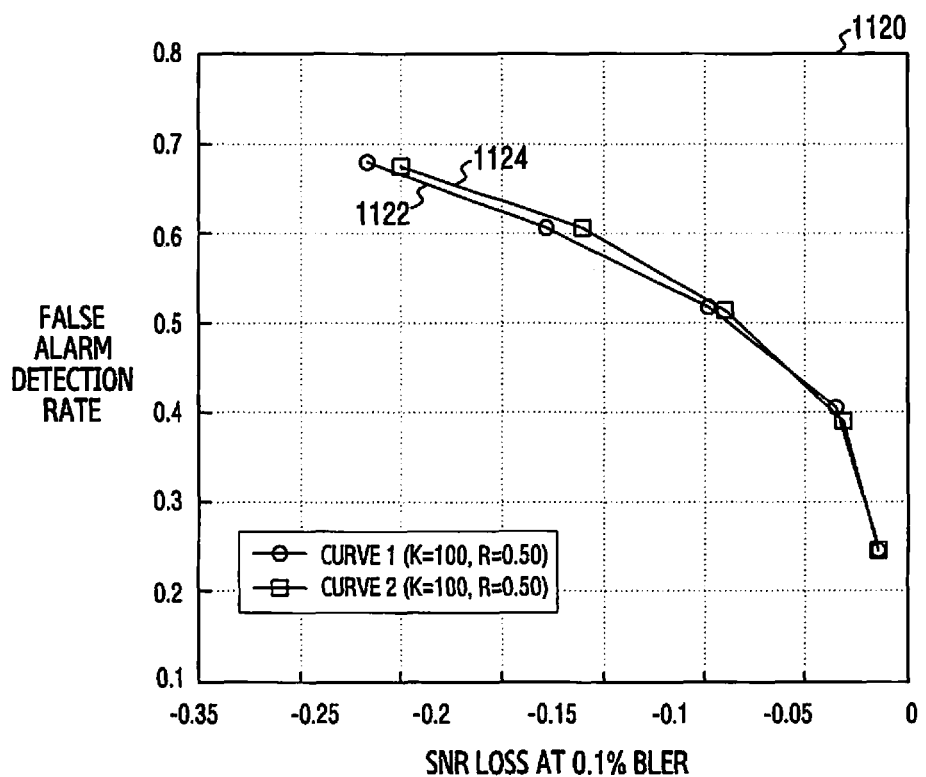
Figure 11C:
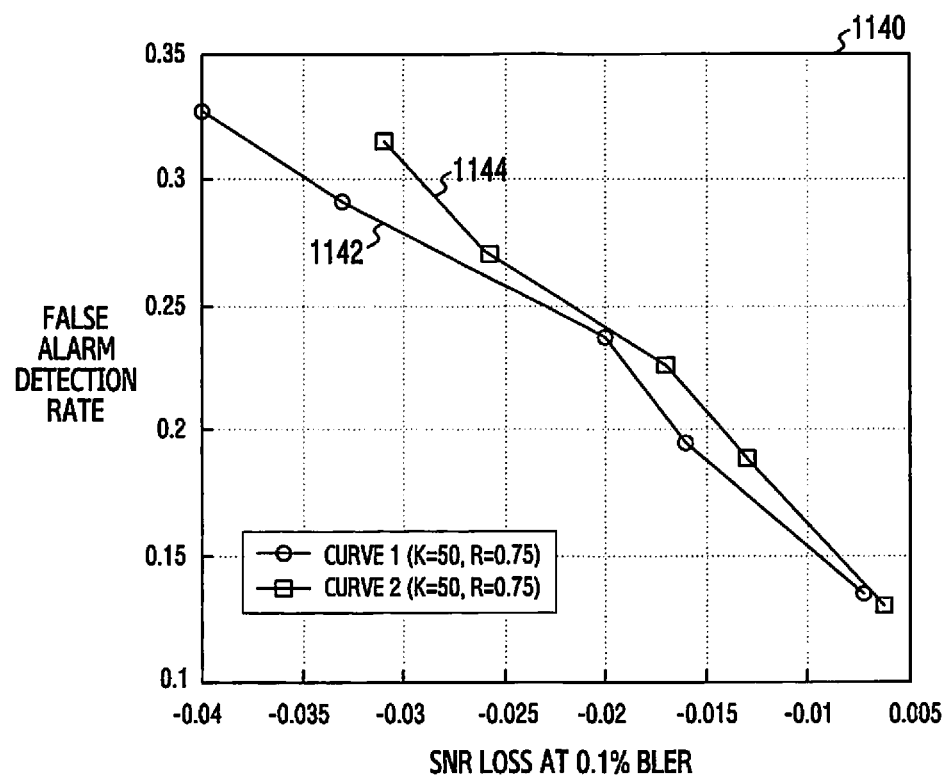
Figure 11D:
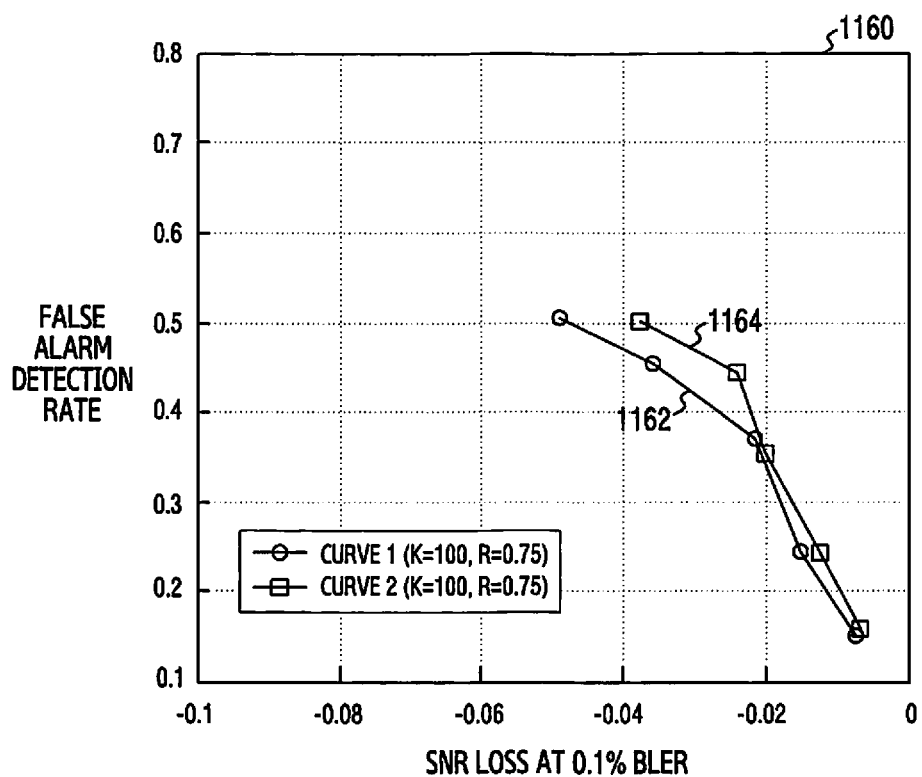

FIG. 8 is a flowchart of a receiving node for detecting a false alarm with respect to decoding success in a wireless communication system according to various embodiments of the present disclosure. FIG. 8 illustrates an operating method of a base station 110, a terminal 120, or a terminal 130 as operations of the receiving node.

Referring to FIG. 8, in step 801, the receiving node determines whether a signal energy exceeds a first threshold. Specifically, the receiving node may measure the energy of the received signal, and compare the first threshold for given code length and code rate with an energy metric derived from the measured energy. Alternatively, the receiving node may compare an SNR of the signal with the first threshold. According to various embodiments, the first threshold may be determined according to an SNR target value corresponding to at least one of target values of a residual false alarm rate and a BLER loss rate, and the residual false alarm rate and the BLER loss rate may be set differently depending on a type of transmitted and received information.

If determining that the signal energy exceeds the first threshold, in step 803, the receiving node decodes the received signal. According to various embodiments, the receiving node may determine that an energy metric obtained from the energy detection of the signal exceeds the first threshold. Alternatively, the receiving node may determine that a measured SNR exceeds the first threshold. In this case, the receiving node may determine that a transmit signal exists, and determine to decode the received signal. According to various embodiments, the receiving node may receive a polar code using the CRC, and perform SCL decoding on the received polar code bit by bit.

If determining that the signal energy does not exceed the first threshold, the receiving node may determine early termination without decoding the received signal. According to various embodiments, the receiving node may determine that the energy metric obtained from the energy detection of the signal does not exceed the first threshold. Alternatively, the receiving node may determine that the measured SNR does not exceed the first threshold. That is, if an average energy distribution of the received signal does not exceed the first threshold prestored, the receiving node may determine that the transmit signal does not exist, and determine to terminate early. Through the above-described process, the receiving node may block in advance occurrence of the false alarm passing the CRC check even though the transmit signal does not exist before the decoding.

In step 805, the receiving node determines whether the decoded bits pass the CRC check. According to various embodiments, if performing the SCL decoding using the CRC, the receiving node may perform one decoding and conduct the CRC check on L-ary decoding paths finally determined. If the decoded bits do not pass the CRC check, the receiving node determines that the decoding fails, in step 811.

If the decoded bits pass the CRC check, in step 807, the receiving node determines whether the detection metric exceeds a second threshold. According to various embodiments, if the SCL decoding using the CRC is performed, the receiving node may calculate a detection metric by using at least one of the L-ary decoding paths as shown in <Equation 4>, and compare the calculated detection metric with the second threshold predetermined. In this case, the second threshold may be determined to an optimized value based on at least one of the number of information bits k, the code length n, and the code rate k/n.

If determining that the detection metric exceeds the second threshold, in step 809, the receiving node determines that the decoding is successful. In this case, since the detection metric greater than the threshold is enough to distinguish the decoding path of the highest reliability from the rest decoding paths, the receiving node may determine that the decoding is successful.

If determining that the detection metric does not exceed the second threshold, in step 811, the receiving node determines that the decoding fails. In this case, since the detection metric smaller than the threshold is not enough to distinguish the decoding path of the highest reliability from the rest decoding paths, the receiving node may determine that the decoding fails.

FIG. 9A through FIG. 9C, FIG. 10A and FIG. 10B, and FIG. 11A through FIG. 11D illustrate simulation results of false alarm detection performance based on a detection metric in a wireless communication system according to various embodiments of the present disclosure.

The simulation has been conducted on information bits k=20, 30, 50, 70, 100 and code rates R=0.20, 0.25, 0.30, 0.50, and 0.75 in an environment of a quadrature phase shift keying (QPSK) modulation scheme, an additive white Gaussian noise (AWGN) channel, a list size L=16, and 11-bit CRC for uplink. In addition, a polar code sequence used in the 5G standard has been used as the code.

FIG. 9A through FIG. 11D, a first curve indicates a performance curve if using a detection metric based on a maximum value of path metrics against performing the conventional decoding, and a second curve indicates a performance curve if using a detection metric based on an average value of path metrics according to various embodiment of the present disclosure against the conventional decoding. In addition, the x-axis of the graph represents the SNR loss rate based on BLER=$10^{-3}$, and the y-axis represents the detection rate of whole false alarms occurring. For example, in FIG. 9A, a first curve 902 indicates that the detection metric based on the maximum value of the path metrics may detect false alarms of about 60% with the SNR loss of about 0.2 dB against the conventional decoding. By contrast, a second curve 904 indicates that the detection metric based on the average value of the path metrics may detect false alarms of about 64% with the SNR loss of about 0.2 dB against the conventional decoding. Referring to FIG. 9A through FIG. 11D, in most of the measured areas, the detection metric based on the average value of the path metrics exhibits the higher false alarm detection rate if the BLER loss rate is equal.

Figure 12A:
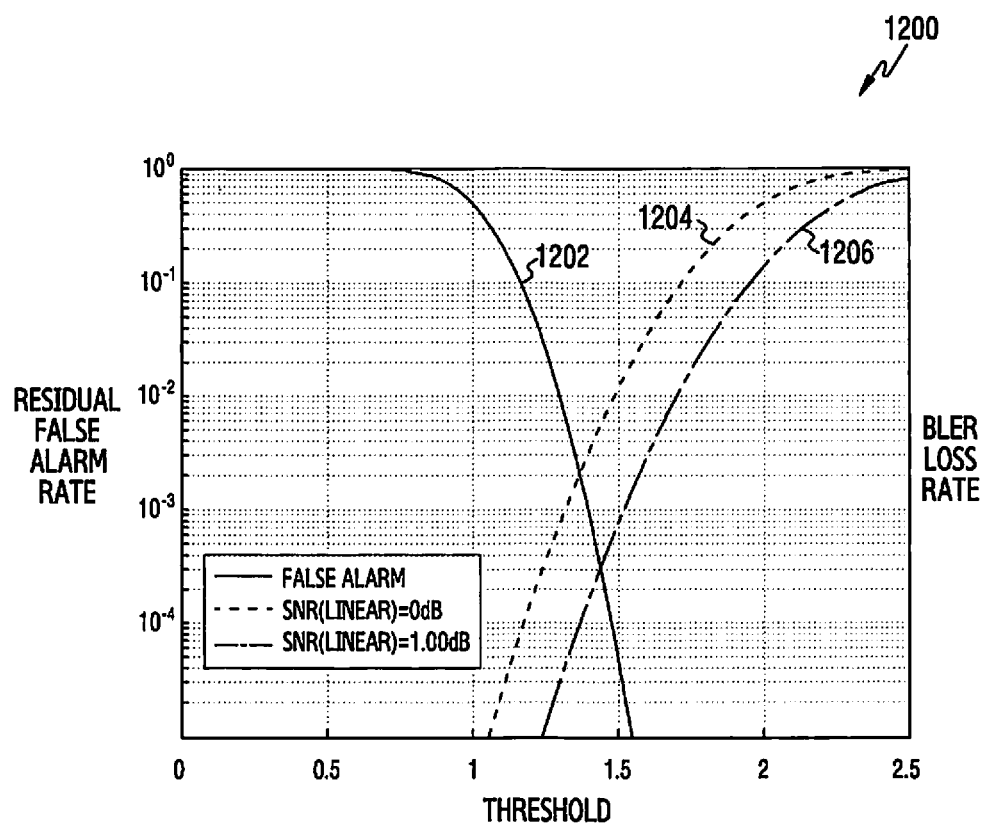
FIG. 12A illustrates simulation results according to a signal-to-noise ratio (SNR), in false alarm rejection based on energy detection in a wireless communication system according to various embodiments of the present disclosure.

FIG. 12A illustrates simulation results according to an SNR, in false alarm rejection based on energy detection in a wireless communication system according to various embodiments of the present disclosure. A curve 1202 indicates a residual false alarm rate according to a threshold, a curve 1204 indicates a BLER loss rate according to the threshold if the SNR value of the received signal is 0 dB, and a curve 1206 indicates a BLER loss rate according to the threshold if the SNR value of the received signal is 1 dB. Referring to the curve 1206, if the threshold is set to 1.25 or so, about 98% of all false alarms are removed without the BLER loss, and residual false alarms of about 2% exist. Referring to FIG. 12A, as the SNR of the received signal increases, an area where the distribution curve of the received signal and the curve 1202 overlap decreases. Hence, a signal having a sufficiently great SNR may remove the false alarms without the BLER loss by setting an appropriate threshold.

Figure 12B:
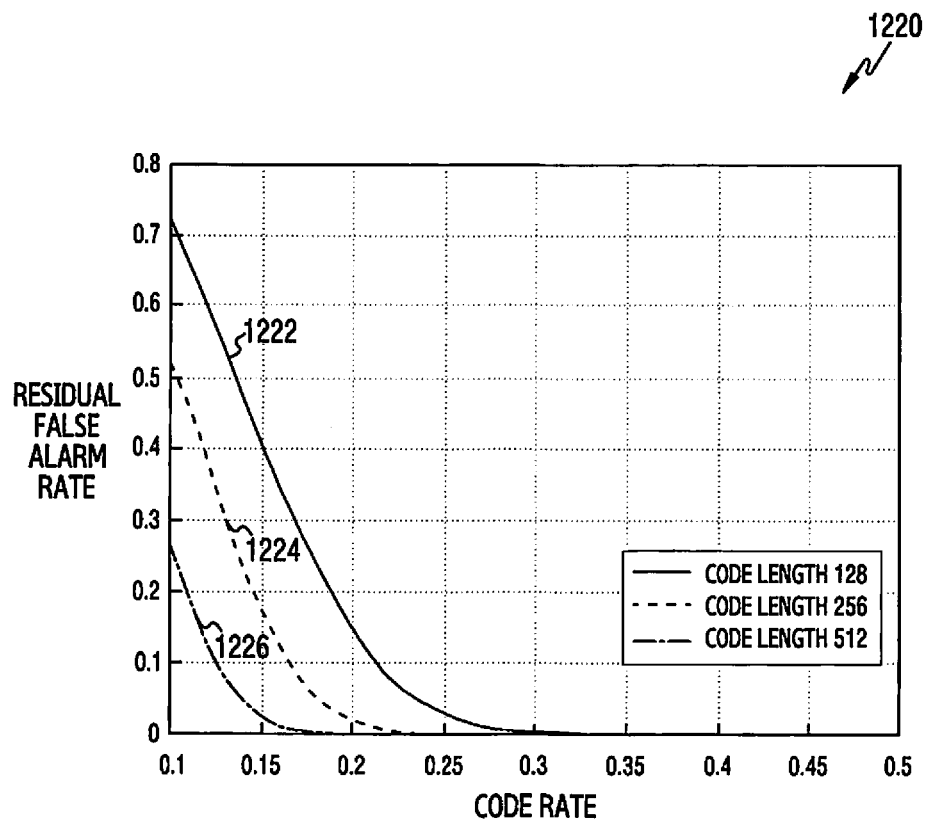
FIG. 12B illustrates simulation results according to a code length, in the false alarm rejection based on the energy detection in the wireless communication system according to various embodiments of the present disclosure.

FIG. 12B illustrates simulation results according to a code length, in the false alarm rejection based on the energy detection in the wireless communication system according to various embodiments of the present disclosure. A curve 1222 indicates the residual false alarm rate according to the code rate if the code length is 128, a curve 1224 indicates the residual false alarm rate according to the code rate if the code length is 256, and a curve 1226 indicates the residual false alarm rate according to the code rate if the code length is 512. Referring to FIG. 12B, as the code length generally increases, the residual false alarm rate reduces, and the false alarm may be removed without the BLER loss by determining an appropriate threshold even at a low code rate of about 0.3. In addition, as the code length increases, false alarms of about 75% may be removed in a range below the code rate 0.1. Hence, the method for determining whether to perform the decoding based on the energy detection as described above may be used to supplement the false alarm reduction method based on the detection metric.

Figure 13A:
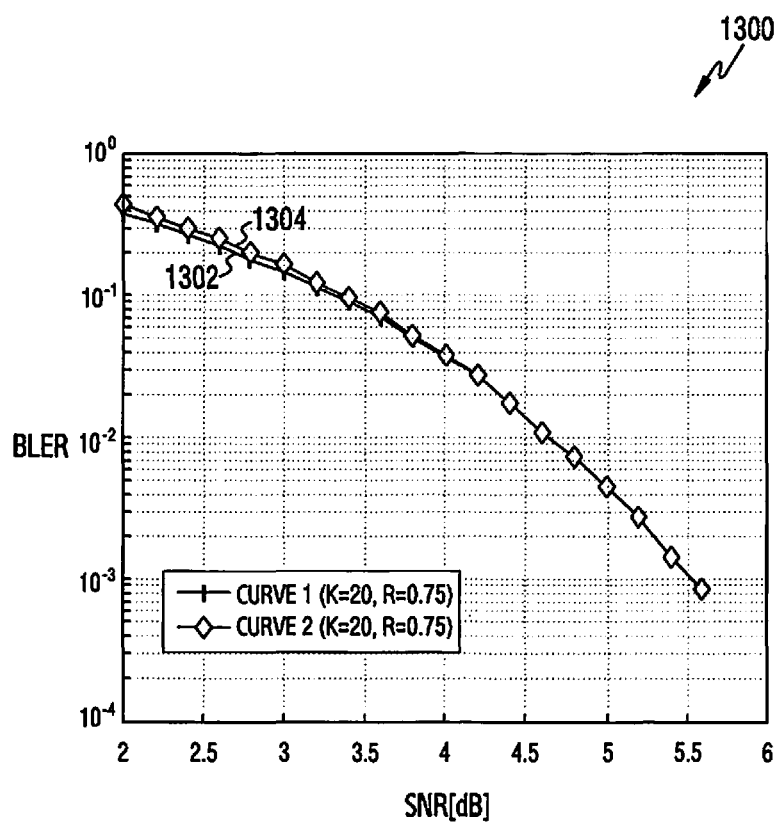
FIG. 13A and FIG. 13B illustrate simulation results of decoding performance, in false alarm rejection based on energy detection in a wireless communication system according to various embodiments of the present disclosure.
Figure 13B:
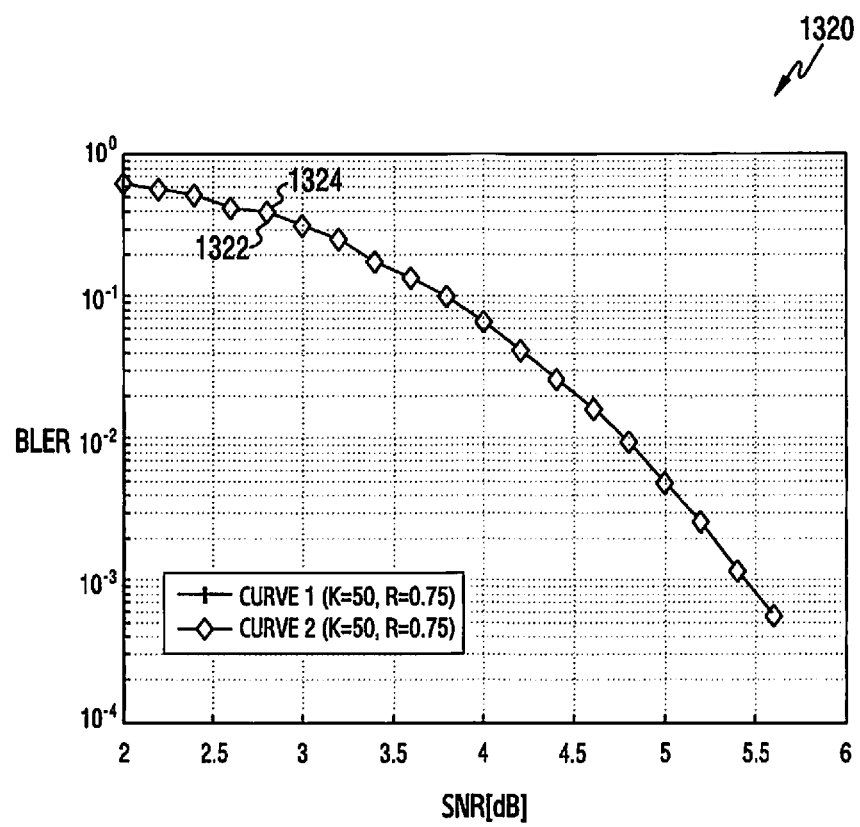

FIG. 13A and FIG. 13B illustrate simulation results of decoding performance, in false alarm rejection based on energy detection in a wireless communication system according to various embodiments of the present disclosure. Curves 1302, 1304, 1322, and 1324 represent the BLER according to the SNR in achieving the false alarm rejection rate over 99%. Curves 1302 and 1322 represent the BLER of performing the conventional decoding, and curves 1304 and 1324 represent the BLER if applying the method of determining whether to perform the decoding based on the energy detection according to various embodiments. Referring to FIG. 13A, with the number of information bits k=20 and the code rate R=0.75, it is identified that the BLER loss in applying the energy detection based method does not exhibit a difference from the conventional method. In addition, referring to FIG. 13B, with the number of information bits k=50 and the code rate R=0.75, it is identified that the BLER loss in applying the energy detection based method does not exhibit a difference from the conventional method.

The methods according to the embodiments described in the claims or the specification of the present disclosure may be implemented in software, hardware, or a combination of hardware and software.

As for the software implementation, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. Also, a plurality of memories may be included.

In addition, the program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the present disclosure, the elements included in the present disclosure are expressed in a singular or plural form. However, the singular or plural expression is appropriately selected according to a proposed situation for the convenience of explanation, the present disclosure is not limited to a single element or a plurality of elements, the elements expressed in the plural form may be configured as a single element, and the elements expressed in the singular form may be configured as a plurality of elements.

Meanwhile, while the specific embodiment has been described in the explanations of the present disclosure, it will be noted that various changes may be made therein without departing from the scope of the present disclosure. Thus, the scope of the present disclosure is not limited and defined by the described embodiment and is defined not only the scope of the claims as below but also their equivalents.

The invention claimed is:

1. A method performed by a receiving node in a wireless communication system, comprising:
receiving a signal from a transmitting node;
determining an energy metric by normalizing an average energy of the received signal;
identifying whether the energy metric exceeds a first threshold;
obtaining a plurality of decoding paths by decoding bits contained in the received signal based on identification that the energy metric exceeds the first threshold; and
identifying whether the decoding is successful based on a detection metric determined based on values representing path metrics of the plurality of the decoding paths,
wherein the detection metric is determined by dividing an absolute value of a difference between a maximum value among the path metrics of the plurality of the decoding paths and a minimum value among path metrics of decoding paths passing a cyclic redundancy check (CRC) check by an average value of the path metrics of the plurality of the decoding paths.

2. The method of claim 1, further comprising:
performing the CRC check on the obtained plurality of the decoding paths; and
calculating the detection metric for at least one decoding path passing the CRC check.

3. The method of claim 1, wherein the value representing the path metrics corresponds to the average value of the path metrics of the plurality of the decoding paths.

4. The method of claim 1, wherein identifying whether the decoding is successful based on the detection metric comprises identifying whether the detection metric exceeds a second threshold.

5. The method of claim 4, wherein the second threshold is determined based on an information bit length, a code length, or a code rate, or a type of information decoded by the receiving node.

6. The method of claim 1, further comprising:
measuring channel quality of a channel between the receiving node and the transmitting node; and
determining whether to decode the bits based on the measured channel quality.

7. The method of claim 6, wherein determining whether to decode the bits based on the measured channel quality comprises:
if the measured channel quality is greater than a third threshold, determining to decode the bits; and
if the measured channel quality is smaller than the third threshold, determining early termination.

8. The method of claim 7, wherein the third threshold is determined based on a channel quality value corresponding to a code rate of the signal.

9. The method of claim 7, wherein the third threshold is determined based on a type of information decoded by the receiving node.

10. The method of claim 1, wherein the first threshold is determined based on a signal to noise ratio (SNR) target value, and
wherein the SNR target value corresponds to at least one of target values of a residual false alarm rate and a block error rate (BLER) loss rate.

11. An apparatus of a receiving node in a wireless communication system, comprising:
a transceiver; and
at least one processor coupled with the transceiver and configured to:
receive a signal from a transmitting node,
determine an energy metric by normalizing an average energy of the received signal,
identify whether the energy metric exceeds a first threshold,
obtain a plurality of decoding paths by decoding bits contained in the received signal,
identify whether the decoding is successful based on a detection metric determined based on values representing path metrics of the plurality of the decoding paths,
wherein the detection metric is determined by dividing an absolute value of a difference between a maximum value among the path metrics of the plurality of the decoding paths and a minimum value among path metrics of decoding paths passing a cyclic redundancy check (CRC) check by an average value of the path metrics of the plurality of the decoding paths.

12. The apparatus of the receiving node of claim 11, wherein the at least one processor is further configured to:
perform the CRC check on the obtained plurality of the decoding paths, and
calculate the detection metric for at least one decoding path passing the CRC check.

13. The apparatus of the receiving node of claim 11, wherein the value representing the path metrics corresponds to the average value of the path metrics of the plurality of the decoding paths.

14. The apparatus of the receiving node of claim 11, wherein the at least one processor is further configured to identify whether the detection metric exceeds a second threshold.

15. The apparatus of the receiving node of claim 14, wherein the second threshold is determined based on an information bit length, a code length, or a code rate, or a type of information decoded by the receiving node.

16. The apparatus of the receiving node of claim 11, wherein the at least one processor is further configured to:
measure channel quality of a channel between the receiving node and the transmitting node, and
determine whether to decode the bits based on the measured channel quality.

17. The apparatus of the receiving node of claim 16, wherein the at least one processor is further configured to:
if the measured channel quality is greater than a third threshold, determine to decode the bits, and
if the measured channel quality is smaller than the third threshold, determine early termination.

18. The apparatus of the receiving node of claim 17, wherein the third threshold is determined based on a channel quality value corresponding to a code rate of the signal.

19. The apparatus of the receiving node of claim 17, wherein the third threshold is determined based on a channel quality value corresponding to a code rate of the signal.

20. The apparatus of the receiving node of claim 11, wherein the first threshold is determined based on a signal to noise ratio (SNR) target value, and
wherein the SNR target value corresponds to at least one of target values of a residual false alarm rate and a block error rate (BLER) loss rate.

* * * * *